US011126944B1

(12) United States Patent
Aggarwal et al.

(10) Patent No.: US 11,126,944 B1
(45) Date of Patent: Sep. 21, 2021

(54) TECHNIQUES FOR OBSTACLE DETECTION AND AVOIDANCE

(71) Applicant: Amazon Technologies, Inc., Seattle, WA (US)

(72) Inventors: Aayush Aggarwal, Medford, MA (US); Vishnu Ayyagari, Boxboro, MA (US); James Plumley, Pelham, NH (US)

(73) Assignee: Amazon Technologies, Inc., Seattle, WA (US)

( * ) Notice: Subject to any disclaimer, the term of this patent is extended or adjusted under 35 U.S.C. 154(b) by 290 days.

(21) Appl. No.: 16/271,334

(22) Filed: Feb. 8, 2019

(51) Int. Cl.
```
G06Q 10/06      (2012.01)
G06F 9/50       (2006.01)
G06Q 10/08      (2012.01)
G05D 1/02       (2020.01)
G05D 1/00       (2006.01)
G01C 21/20      (2006.01)
G01C 21/34      (2006.01)
```

(52) U.S. Cl.
CPC ..... *G06Q 10/06315* (2013.01); *G01C 21/206* (2013.01); *G01C 21/34* (2013.01); *G05D 1/0088* (2013.01); *G05D 1/0221* (2013.01); *G06F 9/5005* (2013.01); *G06Q 10/087* (2013.01); *G05D 2201/0216* (2013.01)

(58) Field of Classification Search
CPC .......... G06Q 10/06315; G06Q 10/087; G05D 1/0221; G05D 1/0088; G05D 2201/0216; G01C 21/34; G01C 21/206; G06F 9/5005
See application file for complete search history.

(56) References Cited

U.S. PATENT DOCUMENTS

| 8,280,547 | B2 | 10/2012 | D'Andrea et al. | |
| 9,087,314 | B2 | 7/2015 | Hoffman et al. | |
| 9,829,333 | B1* | 11/2017 | Calder | G08G 1/166 |
| 10,209,711 | B1* | 2/2019 | Brazeau | G06N 20/00 |
| 2012/0143427 | A1* | 6/2012 | Hoffman | G06Q 10/08 701/23 |
| 2017/0357263 | A1* | 12/2017 | Glatfelter | G06K 9/0063 |

OTHER PUBLICATIONS

U.S. Appl. No. 15/279,264, filed Sep. 28, 2016 "Techniques for Contention Resolution for Mobile Drive Units".
U.S. Appl. No. 16/271,200, filed Feb. 8, 2019, "Techniques for Detecting and Managing Congestion Within a Workspace".

* cited by examiner

*Primary Examiner* — Anne Marie Antonucci
(74) *Attorney, Agent, or Firm* — Kilpatrick Townsend & Stockton LLP

(57) ABSTRACT

Systems and methods are provided herein for obstacle detection and avoidance. An obstacle (e.g., a fallen object, an area of congestion, etc.) may be detected utilizing sensor data and/or navigational information provided by various components of a workspace (e.g., mobile drive units, stand-alone sensors, etc.). Obstacle information corresponding to the obstacle may be utilized to identify tasks within the workspace that may be affected by the obstacle. Paths for these affected tasks may be altered and any subsequent path generated by the system may be generated based at least in part on the obstacle, so long as the obstacle exists. Utilizing the techniques provided herein, the workflows/tasks/paths of the components of the system may be managed so as to avoid interactions between the components of the system and any known obstacle.

20 Claims, 9 Drawing Sheets

TECHNIQUES FOR OBSTACLE DETECTION AND AVOIDANCE

BACKGROUND

Modern inventory systems, such as those in storage and/or sortation facilities (e.g., a warehouse, sortation warehouse) face significant challenges with respect to managing items in inventory. Items may be moved from one location to another within a facility. These functions can be performed by a myriad of robotic devices (e.g., mobile drive units (MDUs)). As these devices travel about the facility, unexpected obstacles may be encountered such as fallen objects, misplaced storage containers, traffic congestion, or the like.

Conventional systems may lack effective methods for obstacle detection and avoidance. Embodiments of the invention address these and other problems.

BRIEF DESCRIPTION OF THE DRAWINGS

Various embodiments in accordance with the present disclosure will be described with reference to the drawings, in which.

DETAILED DESCRIPTION

Figure 1:
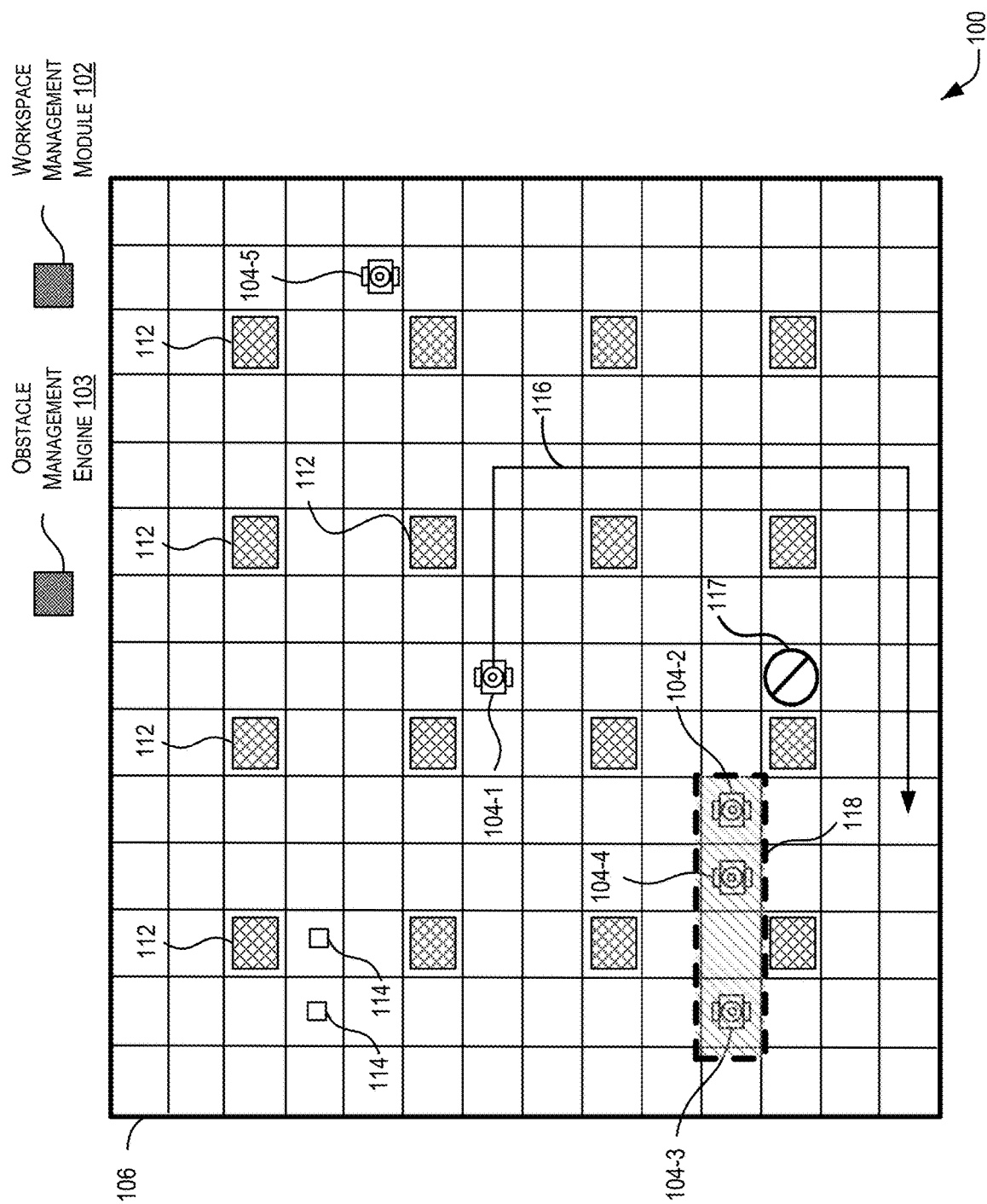
FIG. 1 is a schematic diagram illustrating an example environment suitable for implementing aspects of an obstacle management engine, in accordance with at least one embodiment.

Techniques described herein are directed to systems and methods for detecting and/or avoiding obstacles within a workspace. Although examples throughout may utilize warehouses, sortation facilities, storage facilities, and/or warehouse machinery for illustrative purposes, it should be appreciated that any example herein may be equally applied to other suitable contexts. As used herein, an "obstacle," may include fallen objects, misplaced objects, restricted spaces, storage containers, congestion associated with a plurality of MDUs, liquid on the ground, or the like. A "restricted space" may correspond to a location and/or area within the workspace that is to be avoided by the MDUs of the workspace. As used herein, "congestion" is intended to refer a situation within the workspace in which over a threshold number of components (e.g., MDUs, user computing devices, robotic arms, etc.) are located within a predetermined area size. Throughout the description below, examples that utilize one or more MDUs may equally apply to situations that include any suitable combination of one or more MDUs and/or one or more user devices (e.g., an electronic device worn, carried, operated by, or otherwise generally associated with an individual within the storage facility). Any functionality described with respect to the workspace management module and/or obstacle management engine described herein may be provided to and/or by an MDU and/or a user computing device. Thus, it is envisioned that the workspace management module and/or the obstacle management engine discussed herein may provide obstacle detection and/or avoidance involving any suitable combination of one or more MDUs and/or one or more user computing devices and/or one or more robotic arms within a workspace. Accordingly, any of the examples herein that utilize an MDU may be similarly applied to use cases involving a user computing device and/or a robotic device.

In at least one embodiment, a management module may be responsible for determining tasks and assigning individual tasks to individual MDUs within a storage and/or sortation facility operated by, or on behalf of an electronic marketplace provider (e.g., an online retailer of physical items). For example, the workspace management module may determine that an item (e.g., a single item, a pallet, a cart, or any suitable container that stores one or more items) is to be moved from a first location (e.g., a receiving workstation) to a second location (e.g., a designated storage location within a storage facility, a destination location within a sortation facility, etc.). The workspace management module may determine a storage and/or destination location for the item based on any suitable techniques.

In at least one embodiment, the workspace management module may determine a particular MDU of a set of MDUs operating in the facility. The particular MDU can be determined, for example, based at least in part on the first location, the second location, a location of the particular MDU, or any suitable combination of the above. For example, an MDU that is closest to the first location may be selected. The workspace management module (or individual components/agents of the workspace management module associated with individual MDUs) may generate a set of commands that instruct the MDU to perform a task (e.g., retrieve the item from the first location and deliver it to the second location). In some embodiments, the workspace management module (or a component of the workspace management module) may generate and incrementally provide the set of commands to the tasked MDU. The workspace management module may wait to provide another command until it receives an indication from the MDU that it has successfully completed the previous command.

In at least one embodiment, the MDUs may be configured to provide navigational information (e.g., current location, current speed, current state, etc.) that indicates respective locations of the MDUs. In some embodiments, the navigational information may correspond to any suitable number of time periods (e.g., 2 second time periods, 500 millisecond time periods, etc.). In some examples, each MDU in the workspace may transmit navigational information periodically, at any suitable frequency, upon completion of an assigned task, or the like. Each MDU may further include one or more sensors (e.g., an infrared sensor, a digital camera, a video camera, an RFID scanner and/or an RFID tab, etc.). These sensors may be configured to provide sensor data at any suitable time (e.g., periodically, at any suitable frequency, upon detecting an object, etc.).

An obstacle management engine (e.g., operating as part of the workspace management module 102 or as a separate service/process/standalone module) may be configured to detect one or more obstacles within the workspace based at least in part on the navigational information and/or the sensor data provided by the MDUs of the workspace. The obstacle management engine may generate obstacle information for each obstacle detected within the workspace. As used herein, "obstacle information" is intended to refer to any suitable data that describes one or more attributes (e.g., type, size, shape, duration of existence, etc.) of an obstacle. In some embodiments, obstacle information may include any suitable combination of navigational information and/or sensor data provided by one or more MDUs related to an obstacle. The functionality of the obstacle management engine may be executed at any suitable time. By way of example, the obstacle management engine may be configured to execute various obstacle detection and/or avoidance operations periodically, at a set frequency (e.g., every 500 milliseconds), according to a predetermined schedule, or the like.

As a non-limiting example, an MDU in the course of performing its assigned task, may encounter an obstacle (e.g., a fallen package on the floor of the storage facility, a closed door, a puddle of liquid, an area of congestion, etc.). In at least one example, the MDU may provide various information (e.g., sensor data related to the obstacle, navigational information such as a location of the MDU, a location of the obstacle, an obstacle type, or the like). In some cases, providing this information may constitute a request by the MDU for further instructions, while in other cases, the MDU may transmit a separate request for further instructions to the workspace management module. In at least one example, other obstacle sensing devices (e.g., cameras, infra-red sensors, etc. affixed to stationary and/or moveable/moving objects) may generate sensor data which may be received by the workspace management module and/or the obstacle management module. The obstacle management module may access any received navigational data and/or sensor data to identify one or more obstacles within the workspace.

As a non-limiting example, the obstacle management engine may be configured to obtain and/or generate obstacle information corresponding to an area of congestion within the workspace. Obstacle information corresponding to an area of congestion may include any suitable data that describes the congestion within the congested area. In some embodiments, the obstacle management engine may be configured to detect congestion within the workspace utilizing historic, current, and/or planned locations associated with the MDUs. In some embodiments, the obstacle management engine may be configured to detect congestion occurring currently, congestion observed in the past, and/or congestion that is likely to occur in the future. In some embodiments, the obstacle management engine may generate and/or obtain a grid of overlapping volumes, each volume corresponding to a sub-area of the workspace. The obstacle management engine may utilize navigational information provided by the MDUs and/or planned path data associated with the MDUs to generate a density value for each volume. A density value may indicate a number of components (e.g., MDUs) within a given volume during a particular time period (e.g., a historical time period, a future time period, etc.). For each of the highly dense volumes (e.g., volumes having a number of MDUs over a threshold value), the obstacle management engine may generate a density volume for each time period. In some embodiments, the obstacle management engine may utilize a predetermined protocol to classify particular volumes as being congested based at least in part on density values corresponding to historical time periods and/or density values corresponding to future time period(s). Further examples of congestion detection techniques are disclosed in U.S. patent application Ser. No. 16/271,200, filed on Feb. 8, 2019, titled "TECHNIQUES FOR DETECTING AND MANAGING CONGESTION WITHIN A WORKSPACE", the entire disclosure of which is herein incorporated by reference.

It should be appreciated that, in some embodiments, the obstacle management engine may perform operations to identify congested volumes and/or the obstacle management engine may detect congestion by identifying that congested volumes have already been identified (e.g., by another system separate from the obstacle management engine). Supplemental data associated with the congested volumes may be generated and/or obtained for each of the congested drives. Supplemental data of a congested volume may include any suitable combination of identifiers for MDUs currently located in the congested volume, identifier for MDUs that have been within the congested volume over a threshold number of time periods, respective speeds associated with the MDUs within the congested volume, an average speed of the MDUs within the congested volume, or any suitable information that describes the congestion within the congested volume. As used herein, obstacle information may be considered to include one or more congested volume identifiers and/or the supplemental data associated with the congested volumes.

As another non-limiting example, the obstacle management engine may obtain sensor data and/or navigational information initially provided by a number of MDUs of a workspace. The obstacle management engine may identify (e.g., utilizing image recognition techniques and/or known task assignments and/or navigational information associated with each MDU, etc.) that the sensor data and/or navigational information indicate an obstacle (e.g., a fallen object) at a specific location and/or area of the workspace.

In some embodiments, the obstacle management engine may identify one or more restricted spaces of the workspace. These restricted spaces may each be another example of an obstacle. A restricted space may be identified by the system in any suitable manner (e.g., user defined, identified based on a schedule, identified based at least in part on stored data that identifies the restricted spaces of a workspace, etc.).

In some embodiments, the obstacle management engine may be configured to perform one or more remedial actions based at least in part on the obstacles identified and their corresponding obstacle information (e.g., the location/area associated with the obstacle, the type associated with the obstacle (e.g., fallen object, liquid, restricted space, congestion, etc.)). A remedial action may be any suitable combination of: providing a notification that the obstacle is occurring, causing modification of at least one planned path corresponding to at least one of the MDUs, cancelling a task, reassigning a task, and/or causing at least one path to be newly generated for at least one of the MDUs of the workspace based at least in part on one or more of the obstacles identified within the warehouse.

In some embodiments, the obstacle management engine may generate and store obstacle information (e.g., the sensor data, any suitable navigational information, a location/area associated with the obstacle, information defining a restricted space, a type of obstacle (e.g., congestion, fallen object, liquid, restricted space, etc.). In response to detecting the obstacle, the obstacle management engine may determine, based at least in part on planned paths associated with the MDUs of the workspace, a number of MDUs having tasks/planned paths that are affected by the obstacle (e.g., the obstacle overlaps and/or intersects a location and/or area of the planned path (including the current location of the MDU)). In some embodiments, the task and/or planned path may only be affected if the obstacle overlaps and/or intersects a location and/or area of the planned path that has not yet been executed. The obstacle management engine may request, from a path planning module of the management system, a new path for each task affected. In some embodiments, the obstacle management engine may filter out at least one of the affected tasks prior to requesting new paths.

For example, the obstacle management engine may whether or not an obstacle is detected at a source location or destination location associated with a planned path, or at a current location of the MDU. If the obstacle is detected at one of these locations, the task may be reassigned and/or cancelled based at least in part on the type associated with the obstacle and/or any suitable attribute associated with the obstacle (e.g., type, size, shape, duration of existence, etc.). For example, a fallen object located at a destination location of the planned path may cause the task to be reassigned and/or cancelled entirely, while congestion occurring at the destination location may not. In some embodiments, new paths may not be requested for tasks that have already been reassigned and/or cancelled.

A request for a new path may be submitted for the remaining affected paths. The path planning module may be configured to attempt generation of a new path for each request while taking into account the obstacle information associated with known obstacles. Response data (e.g., a new path for the MDU, a denial of the request, etc.) may be provided to the obstacle management engine for further processing.

In some embodiments, the obstacle management engine may determine whether utilizing the originally planned path (the current path) of the MDU is "infeasible." Utilizing the originally planned path may be considered to be "infeasible" when a delay (or other cost) incurred by executing the originally planned path exceeds a predetermined infeasibility threshold due to a detected obstacle. For example, the predetermined infeasibility threshold may be 15 minutes. In some embodiments, the obstacle management engine may generate a metric (e.g., an estimated completion time) that identifies a time of completion for the task should the planned path be utilized for task execution in light of the obstacle detected. In some embodiments, a task completion time that was determined before the obstacle was detected (herein referred to as the "original task completion time") may be compared to the estimated task completion time that is calculated based at least in part on the obstacle detected (herein referred to as the "obstacle-based task completion time"). If the obstacle-based task completion time exceeds the original task completion time by at least the predetermined infeasibility threshold, then executing the task utilizing the planned path may be considered "infeasible."

In situations in which utilizing the planned path has been determined to be infeasible, and the response data indicates a denial of the request (e.g., a new path was unavailable, etc.), the obstacle management engine may transmit any suitable data to any suitable module of the workspace management module in order to cause the task assigned to the MDU to be reassigned to a different MDU or cancelled altogether.

As another example, if a new path was provided in the response data, the obstacle management engine may generate a metric for the new path that identifies a time of completion for the task should the new path be utilized for task execution (herein referred to as a "new path completion time"). In some embodiments, if a comparison of the new path completion time to the original task completion time exceeds the infeasibility threshold, the obstacle management engine may transmit any suitable data to any suitable module of the workspace management module in order to cause the task assigned to the MDU to be reassigned to a different MDU or cancelled altogether. Thus, if utilizing the planned path is determined to be infeasible and utilizing the new path is also determined to be infeasible, the task may be reassigned or cancelled.

In some embodiments, if utilizing the planned path is determined to be infeasible, but utilizing the new path is not infeasible (e.g., the new path completion time is less than the original completion time of the planned path, or at least does not exceed the original completion time by over the infeasibility threshold, etc.), the obstacle management engine may associate the task with an "Alternate_Feasible_Path" label. In some embodiments, the obstacle management engine, through this association or otherwise, may cause the MDU assigned to the task to execute the task utilizing the new path. The obstacle management engine may perform any suitable operations to cause the MDU to commence execution of the task utilizing the new path such as transmitting the task, the label, and/or the new path to the MDU and/or to the workspace management module.

In some embodiments, the obstacle management engine may determine that, although utilizing the planned path is not infeasible, utilizing the new path may result in a completion time that is less than the obstacle-based completion time and/or original completion time of the planned path by at least a predetermined cost threshold amount. Accordingly, the obstacle management engine may determine that the new path is a cheaper alternative to the planned path. In some embodiments, the obstacle management engine may store an association of the new path and the MDU with a classification label indicating that a cheaper path exists (e.g., "Cheaper_Path_Available"). In some embodiments, the obstacle management engine may update a corresponding task (e.g., a task assignment assigned to the MDU) to indicate the classification label and/or the new path. Any suitable combination of the task assignment, classification label, and/or new path may be provided to the MDU and/or workspace management module. The MDU and/or the workspace management module may perform any suitable operations to determine whether or not to cause the MDU to execute the task utilizing the new path.

In some embodiments, if utilizing the planned path is feasible (e.g., not infeasible) and utilizing the new path is not cheaper than the planned path by at least the cost threshold amount, the obstacle management engine may ignore the new path and the MDU may continue executing the task utilizing the planned path.

It should be appreciated that the workspace management module (e.g., a route planning module of the workspace management module) may be configured to utilize the obstacle information generated above when determining planned paths for the MDUs. That is, once an obstacle is detected (e.g., by the obstacle management engine), any subsequently path may be generated such that the obstacle is avoided. In some embodiments, based on sensor data and/or navigational information, the obstacle management engine may identify that a previously detected obstacle no longer exists. In these embodiments, the obstacle information may be deleted or otherwise ignored for subsequent path planning operations. In some embodiments, a similar process of determining affected MDUs and requesting new path, determining metrics for planned/new paths, identifying a remedial action based on the comparison, and the like, may be executed not only when obstacles are detected (or at least new obstacles are detected), but also when previously detected obstacles are determined to no longer exist.

It should be appreciated that the techniques discussed above are applicable in contexts other than inventory situations. The techniques disclosed herein provide, at least, a system and method detecting and/or avoiding obstacles within a workspace. Utilizing the techniques described herein, the inventory system may be configured to respond to ever changing conditions within the workspace. The inventory system may operate more efficiently with respect to the MDUs/user devices operating within facility as task completion delays may be reduced by identifying obstacles within the facility and causing one or more remedial actions (e.g., determining alternative path(s), altering previously assigned paths, ensuring future paths avoid such obstacles, cancelling and/or reassigning tasks, etc.) to be performed based at least in part on the obstacles identified. In some embodiments described herein, obstacles that have not yet occurred (e.g., future congestion) may be identified and utilized in path planning efforts to avoid obstacles that have not yet physically transpired.

Embodiment of the present invention may provide numerous benefits over previous techniques. Conventional path planning techniques employ a greedy approach for planning paths that does not take into account the path plans being executed by other MDUs. Additionally, it may be the case that in conventional systems, a component (e.g., an MDU) may first experience an obstacle first hand (e.g., the obstacle affects a next step in task execution) before any remedial action may be executed. This may increase the delay in task completion while the MDU waits at the obstacle. The techniques provided herein ensure that, regardless of the particular manner in which the obstacle is detected (e.g., via sensor data and/or navigational information of the MDU, a different MDU, a sensor separate from the MDU), any suitable number of MDUs of the workspace may benefit from the obstacle being known, without each MDU having to experience the obstacle first hand. Still further, future paths that are generated after the obstacle is known may be generated so as to take into account the location/areas of known obstacles. As areas/locations are recovered within the workspace (e.g., due to detecting a previously known obstacle no longer exists), current and/future paths may be modified/generated utilizing such information. Through utilizing these techniques, efficient use of the workspace may be optimized and wasteful processing may be avoided, thus, providing numerous improvements over conventional methods.

FIG. 1 is a schematic diagram illustrating an example environment 100 suitable for implementing aspects of an obstacle management engine 103, in accordance with at least one embodiment. The environment 100 may include a workspace management module 102 and one or more mobile drive units (MDUs) (e.g., the MDUs 104-1, 104-2, 104-3, 104-4, 104-5, collectively referred to as "MDUs 104") operating within a workspace 106 (e.g., a sortation facility where items are sorted, or the like). Although workspace 106 may be depicted in FIG. 1 as a sortation facility, it should be appreciated that the techniques described herein may apply to other contexts (e.g., a storage facility, a warehouse, etc.).

The workspace management module 102 may be configured to manage various task assignments and navigational aspects of the MDUs 104 with the workspace 106. Each of the MDUs 104 may be configured to move items within the workspace 106. Additional elements within the workspace 106 may include one or more of the receptacles 112. In some embodiments, the workspace 106 may include transfer areas (not depicted) where items may be obtained by the MDUs 104 and conveyed to various delivery locations (e.g., receptacles 112). It should be appreciated that the workspace 106 may include additional elements and/or components not depicted in FIG. 1.

The receptacles 112 may be in various forms. By way of example only, the receptacles 112 may be in any suitable form and configured to receive one or more items. Some of the receptacles 112 may include storage locations and/or containers configured to receive and store one or more physical items. For example, the receptacles 112 may include bins, shelves, racks, or the like. In some examples, the receptacles 112 may include an opening through which items may be deposited (and potentially transported or directed) to a storage container (e.g., a portable storage container, a stationary storage container, etc.).

As a non-limiting example, the workspace 106 may include an elevated floor upon which the MDUs 104 may operate. The receptacles 112 may include an opening within the elevated floor of workspace 106 through which items may be deposited by the MDUs 104. In some examples, the floor may or may not be elevated and the receptacles 112 may include an opening (e.g., directed upward or downward) through which items may be deposited. Storage containers (not depicted) may be placed near to (e.g., below, above, etc.), or may otherwise be attached to, the receptacles 112. An item may be deposited into the receptacles 112 and transported (e.g., via a shoot, a conveyor belt, another MDU/transportation device, or the like) to a storage container (e.g., a bin, a crate, a vehicle, or the like). The storage container may store the item on a temporary or permanent basis. Each of the receptacles 112 may be associated with an identifier that identifies a particular receptacle from the group.

As another non-limiting example, the receptacles 112 may include a storage container on which one or more items may be placed for temporary, permanent, or semi-permanent storage. The receptacles 112 may be a shelving system and/or a storage container having any suitable number of storage containers within which the MDUs 104 may place various items. Each storage container within the receptacles 112 may be associated with an identifier that identifies the particular storage container within the receptacles 112.

In some embodiments, the MDUs may transport any item (e.g., a physical item, the receptacles 112, etc.) between locations within the workspace 106. Accordingly, each of the MDUs 104 may be capable of moving items between locations within the workspace 106 to facilitate the entry, processing, sortation, storage management, and/or removal of items within the workspace 106 and the completion of other tasks involving items.

In at least one embodiment, the workspace management module 102 may assign tasks to appropriate components of workspace 106 (e.g., the MDUs 104) and coordinate operation of the various components in completing the tasks. Although shown in FIG. 1 as a single, discrete component, the workspace management module 102 depicted may represent multiple components and may represent or include portions of the MDUs 104 or other components of the environment 100. The workspace management module 102 may be internal or external to the workspace 106. In some examples, the workspace management module 102 may be communicatively connected to various components of the environment 100 via one or more networks (e.g., the Internet, a wireless network, a local area network, a cellular network, or the like).

The MDUs 104 may represent any devices or components appropriate for use in the workspace 106 based on the characteristics and configuration of the receptacles 112 and/or other components of workspace 106. In a particular embodiment of environment 100, the MDUs 104 represent independent, self-powered devices configured to freely move about the workspace 106. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. The MDUs 104 may be communicatively coupled to the workspace management module 102 via any suitable communication means and according to any suitable communications protocol. It should be appreciated that the examples described herein, may similarly be utilized by any suitable device that is configured to utilize space to move, regardless of whether or not it is able to freely move about the workspace 106. Thus, the obstacle detection and avoidance techniques herein may equally be applied to devices other than MDUs, such as computing devices (e.g., computing devices operated by a user), robotic arms, for example.

The workspace 106 of FIG. 1 represents an area within which the MDUs 104 can move. For example, the workspace 106 may represent all or part of the floor of a mail-order warehouse and/or a sortation facility in which the MDUs 104 operate. Although FIG. 1 shows, for the purposes of illustration, a workspace 106 that includes a fixed, predetermined, and finite physical space, the workspace 106 may have variable dimensions and/or an arbitrary geometry. While FIG. 1 is intended to illustrate a particular embodiment in which the workspace 106 is entirely enclosed in a building, the workspace 106 may be unconstrained by any fixed structure.

In operation, the workspace management module 102 may select particular MDUs of the MDUs 104 to perform particular tasks. Once a task (or many tasks) are assigned, the workspace management module 102 may provide instructions to the MDUs 104. A task and instructions may include one or more sub-tasks. By way of example only, a task of storing a newly received item may include navigating to a particular location (e.g., a transfer area (not depicted), a particular receptacle of the receptacles 112, etc.) and travelling (e.g., along a planned path) to another location (e.g., another area of the workspace 106, one of the receptacles 112, etc.).

The MDUs 104 may be configured to receive task assignments (e.g., from the workspace management module 102 directly, or indirectly. The MDUs 104 may transmit instruction requests (e.g., to the workspace management module 102) and receive instruction responses (e.g., from the workspace management module 102). An instruction request may include navigational information associated with a particular MDU such as a location identifier indicating a current location of the MDU. An instruction response may include information that instructs the MDU to perform particular operations (e.g., begin traveling along a particular heading at a particular speed). The workspace management module 102 may be configured to manage space reservation to the MDUs 104 within the workspace 106. In some embodiments, the workspace management module 102 may reserve space (e.g., a volume, an area, a location, etc.) within the workspace 106 for a particular MDU to execute some suitable portion of its assigned task.

In some embodiments, the workspace 106 may employ fiducial markers 114 that are placed within the workspace 106. The fiducial markers 114 can be embedded in a concrete floor of the workspace 106, or alternatively in a raised floor or supplemental surface disposed over an existing floor surface. The fiducial markers 114 can be distributed (e.g., in a grid-like pattern, in any suitable manner) throughout the workspace 106 and may encode location information via any suitable method (e.g., a location identifier encoded in a bar code, a QR code, MaxiCode, Data Matrix, EZ Code, or any suitable identifying tag or code may be employed, encoded or not).

As the MDUs 104 travel about the workspace 106, The MDUs 104 may be configured to obtain location information (e.g., via a sensor such as a bar code reader, a scanner, an image capture device, etc.) from the fiducial markers 114. Any suitable number of fiducial markers 114 may be utilized and the markers may be situated in any suitable configuration depending on the workspace in which they are utilized. In some embodiments, the MDUs 104 may be configured to determine location information via methods that do not include the fiducial markers 114. By way of example, the MDUs 104 may include a global positioning device which is capable of providing a location of the MDU. As another example, the MDUs 104 may utilize a camera or other suitable sensor for capturing an image of the workspace and determine location information based at least in part on analyzing the image according to any suitable image recognition techniques (e.g., to estimate location based on landmarks and/or markings identified within the image).

In some embodiments, the MDUs 104 may provide navigational information including current location, current state, current speed, planned speed, current heading, and/or other characteristics of the MDUs 104 to the workspace management module 102 to provide updated awareness of the tasks and location of the MDUs 104. In some embodiments, an MDU may provide this navigational information periodically and/or incrementally to notify the workspace management module 102 of its location and/or a completion or delay associated with a portion of its assigned task. As the MDUs 104 travel about the workspace 106, sensor data may be collected by one or more sensors of the MDU. This sensor data may include obstacle information (e.g., an image of an obstacle in the workspace, sensor reading indicating a physical object that was not previously planned to be at a particular location, congestion of one or more MDUs within a sub-area of the workspace, etc.). By way of example, an MDU of the workspace 106 may provide obstacle information (e.g., sensor data) related to obstacle 117 (e.g., a fallen object on the workspace floor). Utilizing the sensor data, the obstacle management engine 103 may be configured to detect the location and existence of the obstacle 117.

In some embodiments, the obstacle management engine 103 may be utilized to identify an area of congestion 118. By way of example, the obstacle management engine 103 (e.g., operating as part of the workspace management module 102 or operating, at least in part, as a separate module) may utilize navigational information provided by the MDUs to identify obstacle information associated with one or more congested areas (e.g., area of congestion 118) of the workspace 106. By way of example, the obstacle management engine 103 may be configured to identify the area of congestion 118 based at least in part on one or more instances of historically provided navigational information corresponding to one or more historic time periods (e.g., 10-20 seconds of the last minute, 20-40 seconds of the last minute, 40-60 seconds of the last minute). Alternatively, the area of congestion 118 may be identified by the obstacle management engine 103 utilizing planned path data indicating future locations of the MDUs 104 within one or more future time periods. In some embodiments, the obstacle management engine 103 may generate supplemental data describing various attributes of the area of congestion 118. Congested volume identifiers and corresponding supplemental data may be an example of obstacle information. In some embodiments, the obstacle management engine 103 may be configured to perform one or more remedial actions based at least in part on the identification of the area of congestion 118 and/or the supplemental data associated with the area of congestion 118.

The obstacle management engine 103 may be configured to utilize the navigational information and/or obstacle information provided by the MDUs 104 (or provided and/or generated by another module of the system) corresponding to any suitable obstacle (e.g., the obstacle 117, the area of congestion 118, etc.) to determine and/or modify planned paths, update task assignment, or any suitable operation related to task assignment and navigation of the MDUs 104 within the workspace 106. In some embodiments, the navigational information and/or obstacle may be stored for additional processing or provided to any suitable component of the system.

Figure 2:
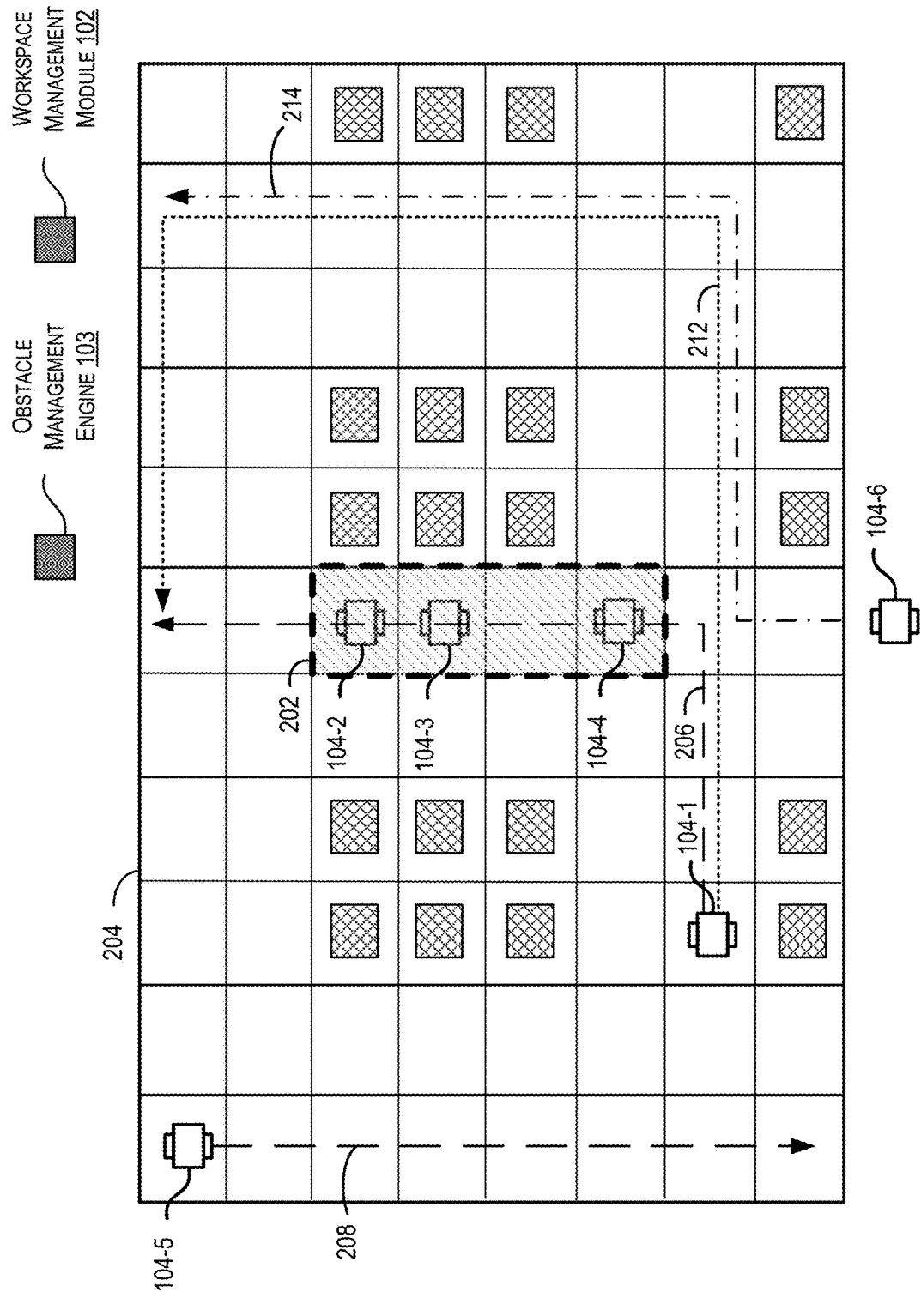
FIG. 2 is a schematic diagram illustrating techniques for performing a remedial action in response to obstacle detection, in accordance with at least one embodiment.

FIG. 2 is a schematic diagram 200 illustrating techniques for performing a remedial action in response to obstacle detection, in accordance with at least one embodiment. In some embodiments, the obstacle management engine 103 may be configured to detect an area of congestion 202 as an obstacle.

For example, the MDU 104-1 may be assigned a task within the workspace 204 (an example of the workspace 106 of FIG. 1, a sub-area of the workspace 106, etc.). At any suitable time, sensor data and/or navigational information provided by the MDUs 104 (e.g., the MDUs 104-1, 104-2, 104-3, 104-5, and 104-6) may be obtained by the obstacle management engine 103. In some embodiments, the obstacle management engine 103 may generate a grid of volumes corresponding to various sub portions of the workspace 204. Each volume may overlap one or more other volumes and the grid of volumes may be generated to cover the entire workspace. The obstacle management engine 103 may perform operations to generate, utilizing the navigational data obtained, density values for each of the volumes of the grid. A current density value for each volume may be generated to indicate a number of MDUs currently within an area associated with the given volume. In some embodiments, a set of one or more historic density values may be generated for each volume corresponding to a number of historic time periods (e.g., 0-20 seconds of the last minute, 20-40 seconds of the last minute, 40-60 of the last minute, etc.). In some embodiments, another set of one or more future density values may be generated for each volume corresponding to a number of future time periods (e.g., 0-10 seconds in the future, 10-20 seconds in the future, etc.). The future density values may be generated by the obstacle management engine 103 based at least in part on planned path data associated with any suitable number of the MDUs in the workspace 204. The obstacle management engine 103 may be configured to execute a protocol set utilizing the current density value, one or more historic density values, and/or one or more future density values associated with a given volume to determine when a volume has become (or will become) congested. Examples of congestion detection techniques are disclosed in U.S. patent application Ser. No. 16/271,200, filed on Feb. 8, 2019, titled "TECHNIQUES FOR DETECTING AND MANAGING CONGESTION WITHIN A WORKSPACE", the entire disclosure of which is herein incorporated by reference.

In the example depicted in FIG. 2, obstacle management engine 103 may utilize these techniques to detect area of congestion 202 (e.g., based on determining that a volume corresponding to area of congestion 202 has become congested, or will become congested). Based at least in part on detecting the area of congestion 202, the obstacle management engine 103 may be configured to identify one or more tasks associated with one or more MDUs of the workspace 204 which may be affected by the area of congestion 202. As a non-limiting example, the obstacle management engine 103 may obtain planned path data for each MDU/task in the workspace 204. The planned path data may be utilized, along with the location/area of the area of congestion 202, to identify that the task currently being executed utilizing planned path 206 associated with MDU 104-1 is affected by the area of congestion 202. Similarly, the obstacle management engine 103 may determine that the planned path 208 associated with MDU 104-5 is unaffected by the area of congestion 202. In some embodiments, the obstacle management engine 103, upon detecting the area of congestion 202 may generate and/or store obstacle information corresponding to the area of congestion 202 for utilization by the workspace management module 102 (e.g., for determining future planned paths for any suitable number of MDUs of the workspace 204).

For each planned path determined to be affected by the obstacle(s) (e.g., the planned path 206), the obstacle management engine 103 may request from the workspace management module 102, a new path for each affected MDU (e.g., the MDU 104-1). In response to one or more requests, the workspace management module 102 may be configured to attempt new path generation for each MDU affected by the area of congestion 202. In the example depicted, the workspace management module 102 (or any suitable module of the workspace management module 102) may attempt generation of a new path (e.g., new path 212) for MDU 104-1. As part of the process for generating a new path, the workspace management module 102 may obtain obstacle information generated/stored by the obstacle management engine 103 (e.g., obstacle information corresponding to one or more obstacles detected within the workspace 204 including obstacle information corresponding to the area of congestion 202). The workspace management module 102 may generate response data including a new path generated (e.g., the new path 212) or an indication that the request was denied (indicating that a new path could not be generated in light of the obstacles within the workspace 204). Response data (e.g., indicating a new path 212 for the MDU, or indicating that a new path could not be generated for MDU 104-1, etc.) may be provided to the obstacle management engine 103 for further processing.

In some embodiments, the obstacle management engine 103 may determine whether the task is feasible or infeasible based at least in part on executing planned path 206 in light of the area of congestion 202. For example, the obstacle management engine 103 may calculate a metric (e.g., an obstacle-based completion time associated with task execution utilizing the planned path 206 in light of the area of congestion 202. If the obstacle management engine 103 determines that difference between the original completion time of the planned path 206 and an obstacle-based completion time of the planned path 206 does not exceed the predetermined infeasibility threshold, then executing the task utilizing the planned path 206 may be considered "feasible." Alternatively, if the difference between the original completion time of the planned path 206 and an obstacle-based completion time of the planned path 206 (e.g., indicating a completion time of the planned path 206 due to the obstacle) is equal to or exceeds the predetermined infeasibility threshold, then executing the task utilizing the planned path 206 may be considered "infeasible."

In situations in which utilizing the planned path 206 has been determined to be infeasible, and the response data indicates a denial of the request (e.g., a new path was unavailable, etc.), the obstacle management engine 103 may transmit any suitable data to any suitable module of the workspace management module 102 in order to cause the task assigned to the MDU 104-1 to be reassigned to a different MDU in the workspace 204 or cancelled altogether.

If new path 212 was provided in the response data, the obstacle management engine may generate a metric for the new path 212 that identifies a time of completion for the task should the new path 212 be utilized for task execution (herein referred to as a "new path completion time"). In some embodiments, if a comparison of the new path completion time to the original task completion time exceeds a predetermined infeasibility threshold, the obstacle management engine 103 may transmit any suitable data to any suitable module of the workspace management module 102 in order to cause the task assigned to the MDU 104-1 to be reassigned to a different MDU or cancelled altogether. Thus, if utilizing the planned path 206 is determined to be infeasible and utilizing the new path 212 is also determined to be infeasible, the task may be reassigned or cancelled.

In some embodiments, if utilizing the planned path 206 is determined to be infeasible, but utilizing the new path 212 is not infeasible (e.g., the new path completion time is less than the original completion time of the planned path, or at least does not exceed the original completion time by over the infeasibility threshold, etc.), the obstacle management engine 103 may cause the task assigned to MDU 104-1 to be associated with an "Alternate_Feasible_Path" label (or a similar label). In some embodiments, the obstacle management engine 103, through this association or otherwise, may cause the MDU 104-1 assigned to the task to execute the task utilizing the new path 212. The obstacle management engine 103 may perform any suitable operations to cause the MDU 104-1 to commence execution of the task utilizing the new path 212 such as transmitting the task, the label, and/or data defining the new path 212 to the MDU and/or to the workspace management module 102.

In some embodiments, the obstacle management engine 103 may determine that, although utilizing the planned path 206 is not infeasible, utilizing the new path 212 may result in a completion time that is less than the obstacle-based completion time and/or original completion time of the planned path 206 by at least a predetermined cost threshold amount. Accordingly, the obstacle management engine 103 may determine that executing the new path 212 is a cheaper alternative to executing the planned path 206. In some embodiments, the obstacle management engine 103 may store an association of the new path 212 and the MDU 104-1 with a classification label indicating that a cheaper path exists (e.g., "Cheaper_Path_Available"). In some embodiments, the obstacle management engine 103 may update a corresponding task (e.g., a task assignment) to indicate the classification label and/or the new path 212 and/or data defining the new path 212. Any suitable combination of the task assignment, classification label, and/or data defining the new path 212 may be provided to the MDU 104-1 and/or workspace management module 102. The MDU 104-1 and/or the workspace management module 102 may perform any suitable operations to determine whether or not to cause the MDU 104-1 to execute the task utilizing the new path 212.

In some embodiments, if utilizing the planned path 206 is not infeasible and utilizing the new path 212 is not cheaper than the planned path by at least the cost threshold amount, the obstacle management engine 103 may ignore the existence new path 212 and the MDU 104-1 may continue executing the task utilizing the planned path 206.

It should be appreciated that changes in completion times (a difference between the respectively completion times for executing the planned path 206 and the new path 212) are utilized as an example only. It is contemplated that other changes and/or differences between executing the planned path and the new path may be utilized. When determining whether or not the new path 212 should be executed in lieu of the planned path 206, the obstacle management engine 103 may utilize any suitable combination of parameters such as a priority of the task, a distance between the current location of the MDU and the destination location for the task, whether or not the task corresponds to conveyance of an item, a priority associated with the item (e.g., expedited shipping of the item), any suitable parameter associated with the task, a determination that one or more other planned paths would need to be altered in the workspace 204 should new path 212 be utilized, a determination that executing the new path 212 may create a new obstacle (e.g., based on future congestion), and the like.

In some embodiments, the obstacle management engine 103 may determine one or more remedial actions to execute. For example, the obstacle management engine 103 may provide a notification (e.g., an email, a text message, an audible alert, a push notification, etc.) to one or more network pages and/or user computing devices to indicate the existence of the obstacle. As another example of a remedial action, the obstacle management engine 103 may transmit the new path and/or the classification label to the MDU 104-1 to cause the planned path of the MDU 104-1 to be altered. By way of example, the obstacle management engine 103 may transmit data defining the new path 212 to the MDU 104-1 which may cause the MDU 104-1 to begin executing the new path 212. As another example, the obstacle management engine 103 may transmit at least the classification label or another indicator corresponding to the classification label that, upon receipt, may cause the MDU 104-1 to request a new path from the workspace management module 102. As another example, the obstacle management engine 103 may store the classification label, new path, and/or any suitable obstacle information within a data store accessible to one or more modules of the workspace management module 102 in order to cause the workspace management module 102 to perform, at any suitable time, one or more operations.

In some embodiments, the workspace management module 102 may utilize obstacle information provided/stored by the obstacle management engine 103 (e.g., obstacle information corresponding to the area of congestion 202) when generating paths for MDUs that have been assigned new tasks subsequent to the detection of the obstacle(s). For example, MDU 104-3 may not have been assigned a task when the area of congestion 202 was detected, or may have been assigned a new task since the area of congestion 202 was detected. The workspace management module 102 may be configured to utilize the obstacle information associated with the area of congestion 202 (and any other known obstacle information) to generate path 214. The workspace management module 102 may utilize the obstacle information such that the path 214 is generated to avoid any known obstacles (e.g., the area of congestion 202).

It should be appreciated that although the obstacle depicted in FIG. 2 as an area of congestion, the same techniques described above may be utilized for any suitable type of obstacle detected. By way of example, rather than detecting an area of congestion, the obstacle management engine 103 may detect (e.g., utilizing sensor data and/or navigational information provided by one or more MDUs) that an obstacle exists at a specific location and/or within an area of the workspace 204. As a non-limiting example, an MDU passing by a fallen object may collect sensor data indicating the existence of the fallen object at a specific location on the floor of the workspace 204. As another example, the obstacle management engine 103 may identify a restricted space of the workspace. Accordingly, the techniques described above may be similarly performed utilizing obstacle information associated with the fallen object or the restricted space rather than the area of congestion 202.

Figure 3:
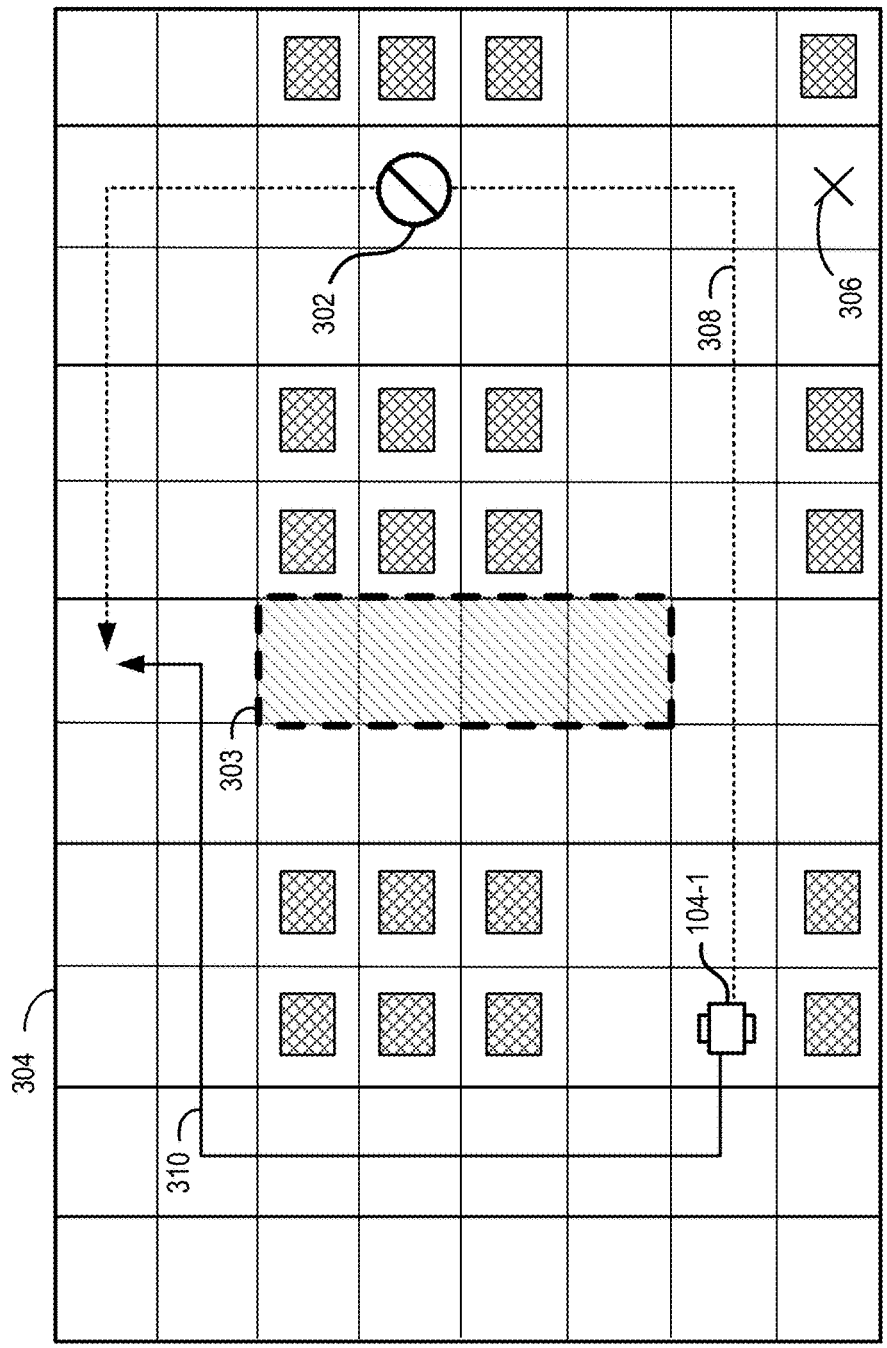
FIG. 3 is a schematic diagram illustrating additional techniques for performing a remedial action in response to obstacle detection, in accordance with at least one embodiment.

FIG. 3 is a schematic diagram 300 illustrating additional techniques for performing a remedial action in response to obstacle detection, in accordance with at least one embodiment. Continuing on with the example of FIG. 2, it may be the case that the obstacle management engine 103 may determine that obstacle 302 exists within the workspace 304 (e.g., the workspace of 204 of FIG. 2). The existence of the obstacle 302 may be determined utilizing any suitable combination of sensor data and/or navigational information provided by any suitable number of MDUs within the workspace 304 and/or by identifying a restricted area of the workspace.

For example, an MDU (not depicted) traveling near the obstacle 302 may collect any suitable sensor data associated with the location of the obstacle 302 utilizing one or more sensors (e.g., digital cameras, video cameras, infrared sensors, thermal sensors, RFID scanners and/or tags, etc.) affixed to the MDU. In some embodiments, one or more sensors situated at a location 306 of the workspace 304 may collect sensor data indicating the existence of the obstacle 302. By way of example only, an MDU with a camera and/or a camera situated at location 306 may provide one or more images (sensor data) to the obstacle management engine 103 that depict a fallen object on the floor of the workspace 304. The obstacle management engine 103 may detect (e.g., utilizing any suitable image recognition techniques, the task assignments of the MDUs, the locations of the MDUs within the workspace 304, or any suitable data) to determine that the fallen object is an obstacle (e.g., a condition that is not supposed to be occurring with the workspace 304).

The obstacle management engine 103 may be configured to determine a location associated with the sensor collector (e.g., a location of the MDU as identified in navigational information provided by the MDU, the location 306 as being associated with a camera, etc.). Utilizing the sensor data and the location associated with the sensor collector, the obstacle management engine 103 may identify a location associated with the obstacle 302. The obstacle management engine 103 may generate obstacle information (e.g., indicating a type of obstacle, the location and/or area of the obstacle, or any suitable information describing any suitable aspect of the obstacle) and may store this obstacle information in a data store configured to store such information and/or the obstacle management engine 103 may provide the obstacle information to any suitable component of the system (e.g., the workspace management module 102, the MDU 104-1, any suitable MDU of the workspace 304, etc.).

In some embodiments, the obstacle 302 may correspond to a restricted space. The obstacle management engine 103 may consult restricted space data that identifies locations and/or areas that are restricted. In some embodiments, a restricted space may be user defined or predetermined. The restricted space may be restricted based at least in part on a scheduled day and/or time, or the restricted space may be persistent.

Continuing with the example provided in FIG. 2, the obstacle 302 may be detected by the obstacle management engine 103 after execution of the assigned path 308 (e.g., new path 212 of FIG. 2) has been assigned to the MDU 104-1. Obstacle 302 may be detected after obstacle 303 (e.g., the area of congestion 202 of FIG. 2, a restricted area, or the like) is detected.

In some embodiments, the obstacle management engine 103 may determine whether or not the task should be reassigned and/or cancelled. In some embodiments, it may be the case that the effect of obstacle 303 has already been assessed (e.g., as described in FIG. 2).

Accordingly, in some embodiments, the obstacle management engine 103 may ignore the obstacle 303 due to having already performed operations to address the effects of the obstacle 303. With respect to obstacle 302, the obstacle management engine 103 may compare the location of the obstacle 302 to various locations of the assigned path 308. If the obstacle is detected at a source location or a destination location of the task, or at a current location of the MDU 104-1, then, depending on any suitable attribute of the obstacle (e.g., type, shape, area, duration of existence, etc.) the task may be reassigned and/or cancelled. For example, a fallen object located at a destination location of the assigned path 308 may cause the task to be reassigned or cancelled while congestion occurring at the destination location may not. In some embodiments, new paths may not be requested for tasks that have already been reassigned or cancelled. In the example depicted in FIG. 3, the task assigned to MDU 104-1 is not reassigned or canceled based at least in part on a determination that the obstacle 302 is not located at a source or destination location associated with the task, or at the current location of the MDU 104-1.

The obstacle management engine 103 may request a new path for MDU 104-1 based at least in part on the determination that the task is affected by the obstacle 302 (e.g., the obstacle 302 overlaps/intersects some (unexecuted) portion of the assigned path 308). The workspace management module 102 (e.g., a path planning module of the workspace management module 102) may be configured to attempt generation of a new path for each request while taking into account the obstacle information associated with known obstacles (e.g., obstacles 302 and 303). Response data (e.g., a new path for the MDU, a denial of the request, etc.) may be provided to the obstacle management engine for further processing.

In some embodiments, the obstacle management engine may determine whether or not the assigned path 308 of the MDU is "infeasible," that is, a delay (or other cost) would be incurred by executing the task utilizing the assigned path 308 exceeds a predetermined infeasibility threshold due to the obstacle 302. In some embodiments, the obstacle management engine 103 may generate a metric (e.g., an estimated completion time) that identifies a time of completion for the task should the assigned path 308 be utilized for task execution in light of the obstacle 302. In some embodiments, a task completion time that was determined before the obstacle 302 was detected (herein referred to as the "original task completion time") may be compared to the estimated task completion time that is calculated based at least in part on the obstacle 302 (herein referred to as the "obstacle-based task completion time"). If the obstacle-based task completion time exceeds the original task completion time by at least the predetermined infeasibility threshold, then executing the task utilizing the assigned path 308 may be considered "infeasible."

In situations in which the assigned path 308 has been determined to be infeasible, and the response data indicates a denial of the request (e.g., a new path was unavailable, etc.), the obstacle management engine 103 may transmit any suitable data to any suitable module of the workspace management module 102 in order to cause the task assigned to the MDU 104-1 to be reassigned to a different MDU or the task may be cancelled altogether.

As another example, if a new path 310 was provided in the response data, the obstacle management engine 103 may generate a metric for the new path 310 that identifies a time of completion for the task should the new path 310 be utilized for task execution (herein referred to as a "new path completion time"). In some embodiments, if a comparison of the new path 310 completion time to the original task completion time of assigned path 308 exceeds the infeasibility threshold, the obstacle management engine 103 may transmit any suitable data to any suitable module of the workspace management module 102 in order to cause the task assigned to the MDU 104-1 to be reassigned to a different MDU or the task may be cancelled altogether. Thus, if the assigned path 308 is determined to be infeasible and the new path 310 is also determined to be infeasible, the task may be reassigned or cancelled.

In some embodiments, if the assigned path 308 is determined to be infeasible, but the new path 310 is not infeasible (e.g., the new path completion time is less than the original completion time of the planned path, or at least does not exceed the original completion time by over the infeasibility threshold, etc.), the obstacle management engine 103 may associate the task with an "Alternate_Feasible_Path" label. In some embodiments, the obstacle management engine, through this association or otherwise, may cause the MDU 104-1 assigned to the task to execute the task utilizing the new path 310. The obstacle management engine may perform any suitable operations to cause the MDU 104-1 to commence execution of the task utilizing the new path 310 such as transmitting the task, the label, and/or data defining the new path 310 to the MDU 104-1 and/or to the workspace management module 102.

In some embodiments, the obstacle management engine 103 may determine that, although the assigned path 308 is not infeasible, the new path 310 may result in a completion time that is less than the obstacle-based completion time and/or original completion time of the assigned path 308 by at least a predetermined cost threshold amount. Accordingly, the obstacle management engine 103 may determine that the new path 310 is a cheaper alternative to the assigned path 308. In some embodiments, the obstacle management engine may store an association of the new path 310 and the MDU 104-1 with a classification label indicating that a cheaper path exists (e.g., "Cheaper_Path_Available"). By way of example, the obstacle management engine 103 may update a corresponding task (e.g., a task assignment for the MDU 104-1) to indicate the classification label and/or the new path 310. Any suitable combination of the task assignment, classification label, and/or data defining the new path 310 may be provided to the MDU 104-1 and/or workspace management module 102. The MDU 104-1 and/or the workspace management module 102 may perform any suitable operations to determine whether or not to cause the MDU 104-1 to execute the task utilizing the new path 310.

In some embodiments, if executing the task with the assigned path 308 is not infeasible and executing the task with the new path 310 is not cheaper than executing the task with the assigned path 308 by at least the cost threshold amount, the obstacle management engine 103 may ignore the new path 310 and the MDU 104-1 may continue executing the task utilizing the assigned path 308.

Figure 4:
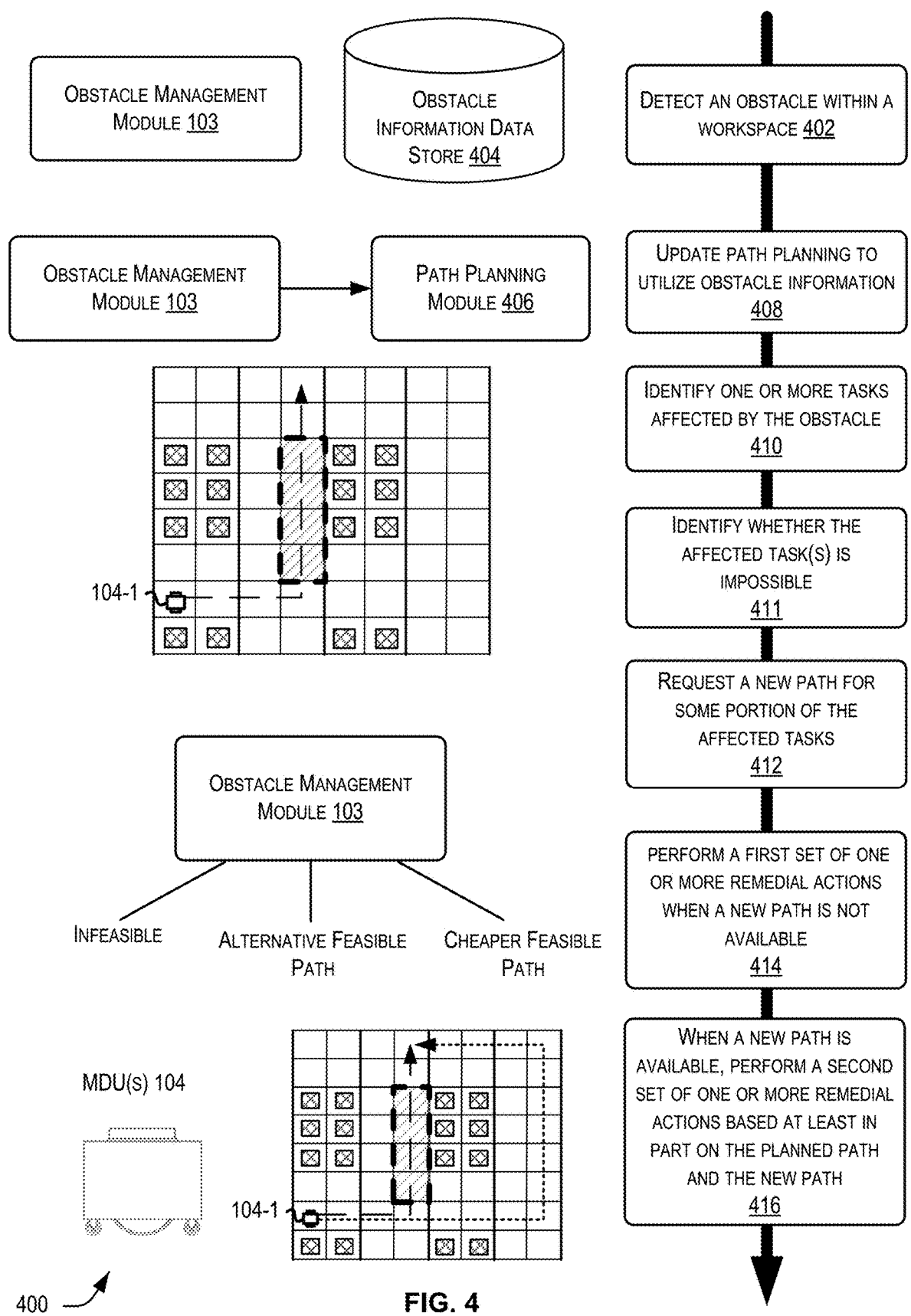
FIG. 4 is a block diagram illustrating an example method for performing at least one remedial action based at least in part on obstacle detection within a workspace, in accordance with at least one embodiment.

FIG. 4 is a block diagram illustrating an example method 400 for performing at least one remedial action based at least in part on obstacle detection within a workspace, in accordance with at least one embodiment.

At step 402, the existence of the obstacle 302 may be detected utilizing any suitable combination of sensor data and/or navigational information provided by any suitable number of MDUs within the workspace 204.

By way of example, MDUs within the workspace may collect any suitable sensor data utilizing one or more sensors (e.g., digital cameras, video cameras, infrared sensors, thermal sensors, RFID scanners and/or tags, etc.) affixed to the MDU. In some embodiments, one or more sensors separate from the MDUs and situated within the workspace may collect sensor data. By way of example only, an MDU with a camera and/or a camera situated within the workspace may provide one or more images (sensor data) to the obstacle management engine 103 that depict an obstacle (e.g., a puddle of water, a fallen object, a misplaced container) within the workspace. The obstacle management engine 103 may detect (e.g., utilizing any suitable image recognition techniques, the task assignments of the MDUs, the current known locations of the MDUs within the workspace (as determined by navigational data provided by the MDUs), or any suitable data) to determine that the sensor data indicates an obstacle (e.g., a condition that is not supposed to be occurring with the workspace).

The obstacle management engine 103 may be configured to determine a location associated with the sensor collector (e.g., a location of the MDU as identified in navigational information provided by the MDU, the location associated with a camera, etc.). Utilizing the sensor data and/or the location associated with the sensor collector, the obstacle management engine 103 may identify a location associated with the obstacle. The obstacle management engine 103 may generate obstacle information (e.g., indicating a type of obstacle, the location and/or area of the obstacle, or any suitable information describing any suitable aspect of the obstacle) and may store this obstacle information in obstacle information data store 404 and/or the obstacle management engine 103 may provide the obstacle information to any suitable component of the system (e.g., the path planning module 406, a component of the workspace management module 102 of FIGS. 1-3).

In some embodiments, the obstacle may be detected based at least in part on navigational information provided by the MDUs of the system. The obstacle management engine 103 may generate a grid of volumes corresponding to various sub portions of the workspace. These volumes may include a set of vertical volumes and/or a set of horizontal volumes. Each volume may overlap one or more other volumes and the grid of volumes may be generated to cover the entire workspace. The obstacle management engine 103 may perform operations to generate density values for each of the volumes of the grid, utilizing the navigational information indicating locations of each MDU. A current density value for each volume may be generated to indicate a number of MDUs currently within an area associated with the given volume. In some embodiments, a set of one or more historic density values may be generated for each volume corresponding to a number of historic time periods (e.g., 0-20 seconds of the last minute, 20-40 seconds of the last minute, 40-60 of the last minute, etc.). In some embodiments, another set of one or more future density values may be generated for each volume corresponding to a number of future time periods (e.g., 0-10 seconds in the future, 10-20 seconds in the future, etc.). The future density values may be generated by the obstacle management engine 103 based at least in part on planned path data associated with any suitable number of the MDUs in the workspace 204. The obstacle management engine 103 may be configured to execute a protocol set utilizing the current density value, one or more historic density values, and/or one or more future density values associated with a given volume to determine when a volume has become (or will become) congested. When an area of current and/or future congestion is identified, the obstacle management engine 103 may be configured to generate obstacle information that describes any suitable aspect of the congestion (e.g., a location/area of the congestion, etc.) and store the obstacle information within the obstacle information data store 404.

At 408, the obstacle management engine 103 may be configured to update path planning operations for the workspace utilizing the obstacle information. In some embodiments, storing the obstacle information in the obstacle information data store 404 may cause path planning operations (e.g., performed by the path planning module 406) to utilize the obstacle information when determining new paths for task execution. In some embodiments, the obstacle management engine 103 may be configured to provide an indication of the existence of the obstacles, or the obstacle information itself, directly to the path planning module 406 to stimulate utilization of the obstacle information for path planning purposes. In other embodiments, the obstacle management engine 103 may be configured to store an indication of the existence of the obstacles and/or the obstacle information in a data store accessible to the path planning module 406 to cause the path planning module 406 to consider the obstacle for subsequent path planning operations.

At 410, based at least in part on detecting the obstacle, the obstacle management engine 103 may be configured to identify one or more tasks affected by the detected obstacle. As a non-limiting example, the obstacle management engine 103 may obtain planned path data for each MDU in the workspace. The planned path data may be utilized, along with the location/area of the obstacle (e.g., a portion of the obstacle information), to identify that a particular planned path of a task is affected by the obstacle. For example, the obstacle management engine 103 may determine that a planned path will be affected due to determining that the obstacle overlaps and/or intersects any suitable portion of the planned path (e.g., a portion of the planned path that has not yet been executed by the corresponding MDU).

At 411, the obstacle management engine 103 may determine whether or not the task is to be reassigned or cancelled altogether. As a non-limiting example, the obstacle management engine 103 may determine a location of the obstacle corresponds to a source location (e.g., a location at which the task is commenced) or a destination location (e.g., a location at which a task is completed) associated with the task assigned to an MDU, or a current location of the MDU. If either the source location or destination location of a task is determined to overlap with a location/area of the obstacle, the obstacle management engine 103 may transmit a request to reassign the task currently assigned to that MDU to another MDU in the workspace, or request that the task be cancelled altogether. In some embodiments, the transmission of the request to reassign or cancel the task may depend on any suitable attribute (e.g., type, area, shape, duration of existence, etc.) of the obstacle involved. By way of example, if the source location and/or the destination location of the task overlaps the obstacle, and the obstacle is not congestion-based (e.g., a fallen object, a restricted space, etc.), a request for cancellation and/or reassignment may be transmitted. However, in some cases, even if the source location and/or the destination location of the task overlaps the obstacle, a request to reassign or cancel the task may not be transmitted if the obstacle is associated with a type indicating congestion. As yet another example, if the source location of the task, the destination location of the task, or a current location of the MDU overlap an obstacle that is a restricted area, a request for reassignment or cancellation of the task may be transmitted.

At 412, a request (or respective request) for at least some number of the affected paths may be submitted. By way of example, a request may be submitted for each task that has been determined to be affected in light of the obstacle. In some embodiments, if a request for reassignment and/or cancellation of the task has already been transmitted, a request for a new path may not be submitted. In some embodiments, the path planning module 406 (or any suitable module of the workspace management module 102 of FIGS. 1-3) may attempt generation of a new path for each new path request. As part of performing a process for generating a new path, the path planning module 406 may obtain obstacle information from the obstacle management engine 103 and/or the obstacle information data store 404. The workspace management module 102 may generate response data including a new path generated and/or an indication that the request was denied (or that a new path could not be generated in light of the obstacles within the workspace). Response data (e.g., indicating a new path for the MDU, or indicating that a new path could not be determined for MDU 104-1, etc.) may be provided to the obstacle management engine 103 for further processing.

At 414, the obstacle management engine 103 may perform a first set of one or more remedial actions when a new path is not provided (e.g., when response data indicates that a new path is unavailable and/or when the corresponding request for a new path has been denied). The obstacle management engine 103 may transmit any suitable data to any suitable module of the workspace management module 102 in order to cause the task assigned to an MDU (e.g., MDU 104-1) to be reassigned to a different MDU in the workspace and/or cancelled altogether.

By way of example, the obstacle management engine 103 may determine whether executing the task with the originally planned path (the current path) of the MDU is "infeasible," that is, a delay (or other cost) would be incurred by executing the originally planned path exceeds a predetermined infeasibility threshold as a result of one or more detected obstacles. In some embodiments, the obstacle management engine may generate a metric (e.g., an estimated completion time) that identifies a time of completion for the task should the planned path be utilized for task execution in light of the obstacle(s) detected. In some embodiments, a task completion time that was determined before the obstacle(s) were detected (herein referred to as the "original task completion time") may be compared to the estimated task completion time that is calculated based at least in part on the obstacle(s) detected (herein referred to as the "obstacle-based task completion time"). If the obstacle-based task completion time exceeds the original task completion time by at least the predetermined infeasibility threshold, then executing the task utilizing the planned path may be considered to be "infeasible."

In situations in which executing the task utilizing the planned path has been determined to be infeasible, and the response data indicates a denial of the request (e.g., a new path was unavailable, etc.), the obstacle management engine 103 may transmit any suitable data to any suitable module (e.g., the workspace management module 102) in order to cause the task assigned to the MDU to be reassigned to a different MDU or cancelled altogether.

At 416, the obstacle management engine 103 may perform a second set of one or more remedial actions when a new path is provided/indicated in the response data. If a new path was provided in the response data, the obstacle management engine 103 may generate a metric for the new path that identifies a time of completion for the task should the new path be utilized for task execution (herein referred to as a "new path completion time"). In some embodiments, if a comparison of the new path completion time to the original task completion time exceeds the infeasibility threshold, the obstacle management engine may transmit any suitable data to any suitable module (e.g., the workspace management module 102) in order to cause the task assigned to the MDU to be reassigned to a different MDU or cancelled altogether. Thus, if executing the task utilizing the planned path is determined to be infeasible and executing the task utilizing the new path is also determined to be infeasible, the task may be reassigned or cancelled.

In some embodiments, if executing the task utilizing the planned path is determined to be infeasible, but executing the task utilizing the new path is not infeasible (e.g., the new path completion time is less than the original completion time of the planned path, or at least does not exceed the original completion time by over the infeasibility threshold, etc.), the obstacle management engine 103 may associated the task with an "Alternate_Feasible_Path" label. In some embodiments, the obstacle management engine 103, through this association or otherwise, may cause the MDU assigned to the task to execute the task utilizing the new path. The obstacle management engine 103 may perform any suitable operations to cause the MDU to commence execution of the task utilizing the new path such as transmitting the task, the label, and/or the new path to the MDU and/or to the workspace management module 102 of FIGS. 1-3.

In some embodiments, the obstacle management engine 103 may determine that, although executing the task utilizing the planned path is not infeasible, executing the task utilizing the new path may result in a completion time that is less than the obstacle-based completion time and/or original completion time of the planned path by at least a predetermined cost threshold amount. Accordingly, the obstacle management engine 103 may determine that utilizing the new path for task execution is a cheaper alternative to utilization of the planned path. In some embodiments, the obstacle management engine 103 may store an association of the new path and the MDU with a classification label indicating that a cheaper path exists (e.g., "Cheaper_Path_Available"). In some embodiments, the obstacle management engine 103 may update a corresponding task (e.g., a task assignment) to indicate the classification label and/or the new path. Any suitable combination of the task assignment, classification label, and/or new path may be provided to the MDU and/or workspace management module. The MDU and/or the workspace management module may perform any suitable operations to determine whether or not to cause the MDU to execute the task utilizing the new path.

In some embodiments, if utilizing the planned path for task execution is not infeasible and execution the task utilizing the new path is not cheaper than utilization of the planned path by at least the cost threshold amount, the obstacle management engine 103 may ignore existence of the new path and the MDU may continue executing the task utilizing the planned path.

It should be appreciated that completion times are utilized as an example only. It is contemplated that a comparison between the planned path and the new path may be performed to identify which path may provide the greatest benefit. By way of example, the comparison may utilize completion time and/or any suitable combination of parameters such as a priority of the task, a distance between the current location of the MDU and the destination location for the task, whether or not the task corresponds to conveyance of an item, a priority associated with the item (e.g., expedited shipping of the item), any suitable parameter associated with the task, a determination that one or more other planned paths would need to be altered in the workspace should new path be utilized, a determination that executing the new path may create a new obstacle (e.g., based on future congestion), and the like.

In some embodiments, the obstacle management engine 103 may, based on the metrics generated above, determine one or more remedial actions to execute. For example, the obstacle management engine 103 may provide a notification (e.g., an email, a text message, an audible alert, a push notification, etc.) to one or more network pages and/or user computing devices to indicate the existence of the obstacle. As another example of a remedial action, the obstacle management engine 103 may transmit the new path and/or the classification label to the MDU 104-1 to cause the planned path of the MDU 104-1 to be altered. As another example, the obstacle management engine 103 may transmit at least the classification label or another indicator corresponding to the classification label that, upon receipt, may cause the MDU 104-1 to request a new path for its assigned task from the workspace management module 102. In some embodiments, a classification label of "Alternate_Feasible_Path" may cause the MDU 104-1 to execute the new path associated with the task. A classification label of "Cheaper_Path_Available" may cause the MDU 104-1 to perform any suitable operations to opt to remain on the originally planned path or to execute the new/cheaper path available. In some embodiments, one or more metrics for the planned path and the new path may be provided (e.g., in the same message as the new path and/or classification label) that indicate a difference in task execution between utilizing the planned path and utilizing the new path. Alternatively, the MDU 104-1 may be configured to generate these one or more metrics. In some embodiments, the MDU 104-1 may be configured with code that, when generated, causes the MDU 104-1 to select the planned path or the new path for execution based at least in part on the metric(s). According to some embodiments, the MDU 104-1 may transmit a request to the workspace management module 102 to effectuate a change from the planned path to the new path. It should be appreciated that any suitable combination of the new path, the first metric, the second metric, and/or the classification label may be transmitted to the MDU and/or a component of the workspace management module to effectuate a change in task execution.

As another example of a remedial action, the obstacle management engine 103 may transmit (e.g., to any suitable component of the workspace management module 102) and/or store any suitable combination of the classification label, the originally planned path, the new path, a task assignment, an MDU identifier, and/or any suitable obstacle information within a data store accessible to one or more modules of the workspace management module 102. In some embodiments, the path planning module 406 (or any suitable module of the workspace management module 102) may utilize this received and/or stored data to perform, at any suitable time, one or more operations (e.g., operations for modifying a planned path assigned to an existing task, operations for generating and/or assigning a planned path to a new task, etc.).

For example, the path planning module 406 may utilize obstacle information provided/stored by the obstacle management engine 103 (e.g., obstacle information of the obstacle information data store 404) when generating paths for MDUs within the workspace. In some embodiments, the paths may be generated so as to avoid any known obstacles.

Figure 5:
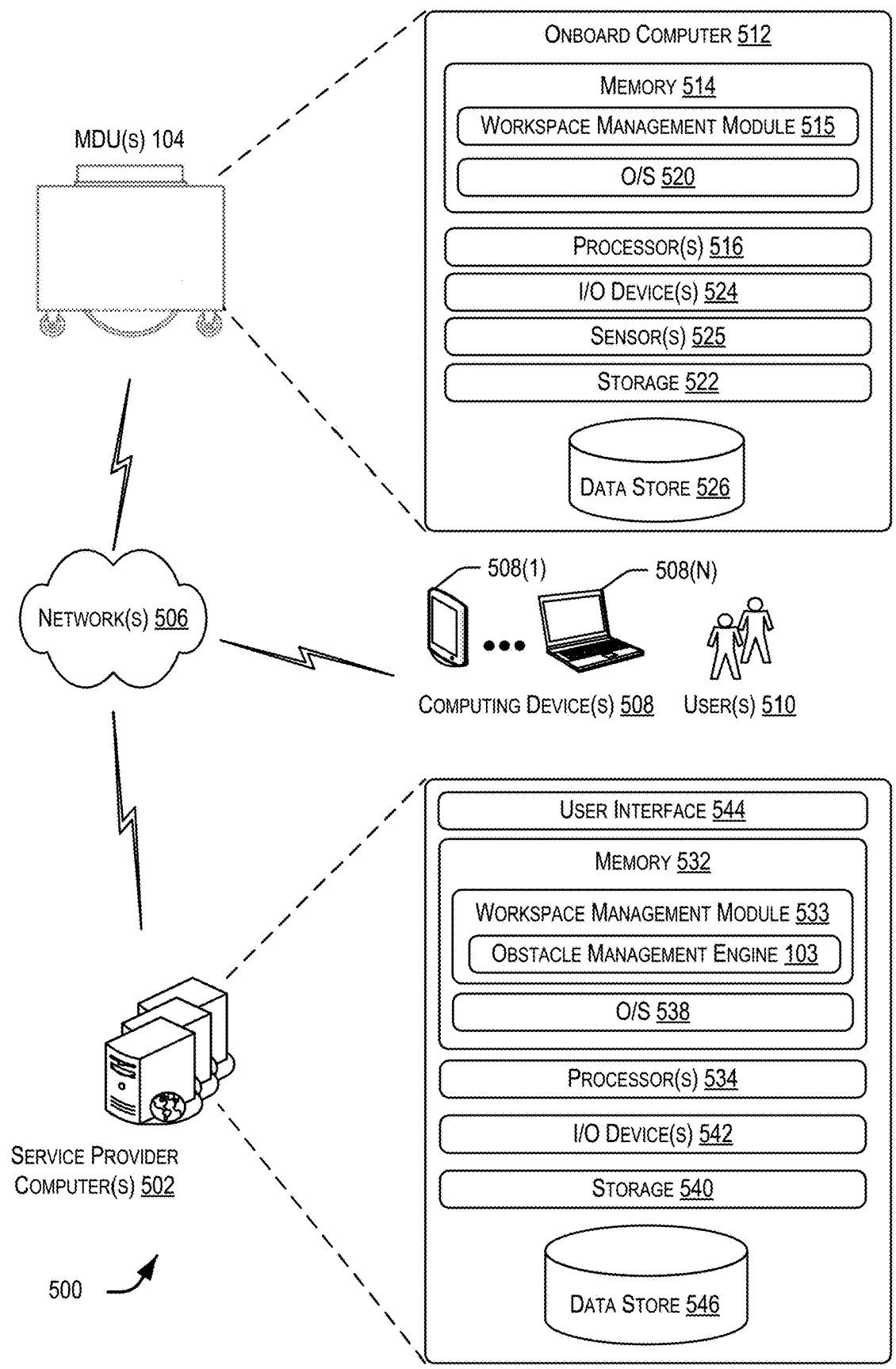
FIG. 5 is an example system architecture for implementing aspects of an inventory system, in accordance with at least one embodiment.

FIG. 5 is an example system architecture for implementing aspects of an inventory system 500, in accordance with at least one embodiment. The architecture of the inventory system 500 may include a service provider computer(s) 502. The service provider computer(s) 502 may support an electronic marketplace (not shown) and interface with purchase and delivery services of the electronic marketplace. In this manner, the service provider computer(s) 502 may coordinate receiving, storing, packaging, shipping, and/or sorting of items in a workspace (e.g., workspace 106 of FIG. 1) operated by, or on behalf of, the electronic marketplace provider. In some examples, the service provider computer(s) 502 may be a stand-alone service operated on its own or in connection with an electronic marketplace. In either example, the service provider computer(s) 502 may be in communication with the mobile drive units 104 via one or more network(s) 506 (hereinafter, "the network 506"). The network 506 may include any one or a combination of many different types of networks, such as cable networks, the Internet, wireless networks, cellular networks, radio networks, and other private and/or public networks.

Computing devices 508(1)-508(N) (hereinafter, "the computing device(s) 508") may also be in communication with the service provider computer(s) 502 via the network 506. The computing device(s) 508 may be operable by one or more user(s) 510 (hereinafter, "the users 510") to access the service provider computer(s) 502 via the network 506. The computing device(s) 508 may be any suitable device capable of communicating with the network 506. For example, the computing device(s) 508 may be any suitable computing device such as, but not limited to, a mobile phone, a smart phone, a personal digital assistant (PDA), a laptop computer, a thin-client device, a tablet PC, a desktop computer, a set-top box, or other computing device. The computing device(s) 508 may include similar components provided in the onboard computer 512, including one or more processors, memory, I/O devices, one or more data stores, additional storage, an operating system, and, in particular embodiments, a management module similar to the workspace management module 515. In some embodiments, the computing device(s) 508 may be utilized to interact with an electronic marketplace (e.g., an electronic marketplace hosted by the service provider computer(s) 502). In some embodiments, the computing device(s) 508 may be operated by one or more individuals working with a workspace (e.g., the workspace 106). The functionality provided by the workspace management module 515 discussed below with respect to the mobile drive unit(s) (MDU(s) 104) may similar be provided by a management module operating on a computing device(s) 508. Likewise, the functionality of management module 533 provided to the MDU(s) 104 may similarly be provided by the computing device(s) 508.

Turning now to the details of the MDU(s) 104, the MDU(s) 104 may include an onboard computer 512 including at least one memory 514 and one or more processing units (or processor(s)) 516. The processor(s) 516 may be implemented as appropriate in hardware, computer-executable instructions, software, firmware, or combinations thereof. Computer-executable instruction, software or firmware implementations of the processor(s) 516 may include computer-executable or machine-executable instructions written in any suitable programming language to perform the various functions described. The memory 514 may include more than one memory and may be distributed throughout the onboard computer. The memory 514 may store program instructions (e.g., program instructions of the workspace management module 515) that are loadable and executable on the processor(s) 516, as well as data generated during the execution of these programs. Depending on the configuration and type of memory including the workspace management module 515, the memory 514 may be volatile (such as random access memory (RAM)) and/or non-volatile (such as read-only memory (ROM), flash memory, or other memory). The memory 514 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. Turning to the contents of the memory 514 in more detail, the memory 514 may include an operating system 520 and one or more application programs, modules or services for implementing the features disclosed herein including at least the workspace management module 515.

In some examples, the onboard computer may also include additional storage 522, which may include removable storage and/or non-removable storage. The additional storage 522 may include, but is not limited to, magnetic storage, optical disks, and/or tape storage. The disk drives and their associated computer-readable media may provide non-volatile storage of computer-readable instructions, data structures, program modules, and other data for the computing devices.

The memory 514 and the additional storage 522, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 512. The modules of the onboard computer 512 may include one or more components. The onboard computer 512 may also include input/output (I/O) device(s) 524 and/or ports, such as for enabling connection with a keyboard, a mouse, a pen, a voice input device, a touch input device, a display, speakers, a printer, or other I/O device. The I/O device(s) 524 may enable communication with the other systems of the MDU(s) 104 (e.g., navigation systems (not depicted), drive controllers (not depicted), etc.). The sensor device(s) 525 may include any suitable number of sensor devices (e.g., infrared sensors, thermal imaging sensors, digital cameras, video cameras, RFID scanner and/or tags, or the like). The workspace management module 515 may comprise code, that, when executed by the processor(s) 516 cause the MDU(s) 104 to collect and transmit sensor data at any suitable time, at a set frequency (e.g., every 10 seconds), periodically, in response to identifying an unexpected object, or at any suitable time, or in response to any suitable stimulus. In some embodiments, the workspace management module 515 may comprise code, that, when executed by the processor(s) 516 cause the MDU(s) 104 to collect and transmit navigational information at any suitable time, at a set frequency (e.g., every 10 seconds), periodically, upon reading a fiducial marker (e.g., the fiducial markers 114 of FIG. 1), or at any suitable time, or in response to any suitable stimulus.

The onboard computer 512 may also include data store 526. The data store 526 may include one or more databases, data structures, or the like for storing and/or retaining information associated with the MDU(s) 104.

Turning now to the details of the computing device(s) 508. The computing device(s) 508 may be used by the user(s) 510 for interacting with the service provider computer(s) 502. The computing device(s) 508 may therefore include a memory, a processor, a user-interface, a web-service application, and any other suitable feature to enable communication with the features of architecture of FIG. 5. The web service application may be in the form of a web browser, an application programming interface (API), virtual computing instance, or other suitable application. In some examples, when the service provider computer(s) 502 are part of, or share an association with, an electronic marketplace, the computing device(s) 508 may be used by the user(s) 510 for procuring one or more items from the electronic marketplace. As discussed above, in some embodiments, the computing device(s) 508 may be operated by one or more individuals working with a workspace (e.g., the environment 100 of FIG. 1).

The service provider computer(s) 502, perhaps arranged in a cluster of servers or as a server farm, may host web service applications. These servers may be configured to host a website (or combination of websites) viewable via the computing device(s) 508. In at least one example, the service provider computer(s) 502 may be configured to manage the MDU(s) 104 as part of an inventory system (e.g., the environment 100 of FIG. 1) and/or the service provider computer(s) 502 may be configured to manage a number of individuals within the inventory system via the computing device(s) 508. The service provider computer(s) 502 may include at least one memory 532 and one or more processing units (or processor(s)) 534. The processor(s) 534 may be implemented as appropriate in hardware, computer-executable instructions, software, firmware, or combinations thereof. Computer-executable instruction, software or firmware implementations of the processor(s) 534 may include computer-executable or machine-executable instructions written in any suitable programming language to perform the various functions described.

The memory 532 may include more than one memory and may be distributed throughout the service provider computer(s) 502. The memory 532 may store program instructions (e.g., management module 533) that are loadable and executable on the processor(s) 534, as well as data generated during the execution of these programs. In some embodiments, obstacle management engine 103 may operate as part of the workspace management module 533. It should be appreciated that the obstacle management engine 103 may operate as a standalone module separate from the workspace management module 533. Depending on the configuration and type of memory including the workspace management module 533, the memory 532 may be volatile (such as random access memory (RAM)) and/or non-volatile (such as read-only memory (ROM), flash memory, or other memory). The service provider computer(s) 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 532 may include multiple different types of memory, such as static random access memory (SRAM), dynamic random access memory (DRAM), or ROM.

Turning to the contents of the memory 532 in more detail, the memory 532 may include an operating system 538 and one or more application programs, modules or services for implementing the features disclosed herein including at least the workspace management module 533. The workspace management module 533, in some examples, may function similarly to the workspace management module 515 with respect to determining tasks for the MDU(s) 104, determining a set of action to perform to execute the task, identifying paths for the MDU(s) 104 to be utilized for performance of their respective assigned tasks, etc. For example, when the MDU(s) 104 are in network communication with the service provider computer(s) 502, the MDU(s) 104 may receive at least some instructions from the service provider computer(s) 502 (e.g., from the workspace management module 533). In some examples, the MDU(s) 104 may execute any suitable portion of the workspace management module 533 to operate independent of the service provider computer(s) 502.

In some examples, the service provider computer(s) 502 may also include additional storage 540, which may include removable storage and/or non-removable storage. The additional storage 540 may include, but is not limited to, magnetic storage, optical disks, and/or tape storage. The disk drives and their associated computer-readable media may provide non-volatile storage of computer-readable instructions, data structures, program modules, and other data for the computing devices.

The memory 532 and the additional storage 540, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the service provider computer(s) 502. The modules of the service provider computer(s) 502 may include one or more components. The service provider computer(s) 502 may also include input/output (I/O) device(s) 542 and/or ports, such as for enabling connection with a keyboard, a mouse, a pen, a voice input device, a touch input device, a display, speakers, a printer, or other I/O device.

In some examples, the service provider computer(s) 502 may include a user interface 544. The user interface 544 may be utilized by an operator, or other authorized user to access portions of the service provider computer(s) 502. In some examples, the user interface 544 may include a graphical user interface, web-based applications, programmatic interfaces such as application programming interfaces (APIs), or other user interface configurations. The service provider computer(s) 502 may also include data store 546. The data store 546 may include one or more databases, data structures, or the like for storing and/or retaining information associated with the service provider computer(s) 502. In some examples, the service provider computer(s) 502 may store a larger amount of information in the data store 546 than the onboard computer 512 is capable of storing in the data store 526. Thus, in some examples, at least a portion of the information from the databases in the data store 546 (e.g., navigation data) may be provided to the databases of the data store 526, e.g., periodically, occasionally, in connection with an event, or otherwise.

In at least one embodiment, the workspace management module 515 and/or the workspace management module 533 (hereinafter, the "management modules") may provide the functionality of the workspace management module 102 of FIG. 1. The obstacle management engine 103 may provide the functionality discussed above in connection with FIG. 1-4 as a standalone module or as part of the workspace management module 533 and/or management module 515.

Figure 6:
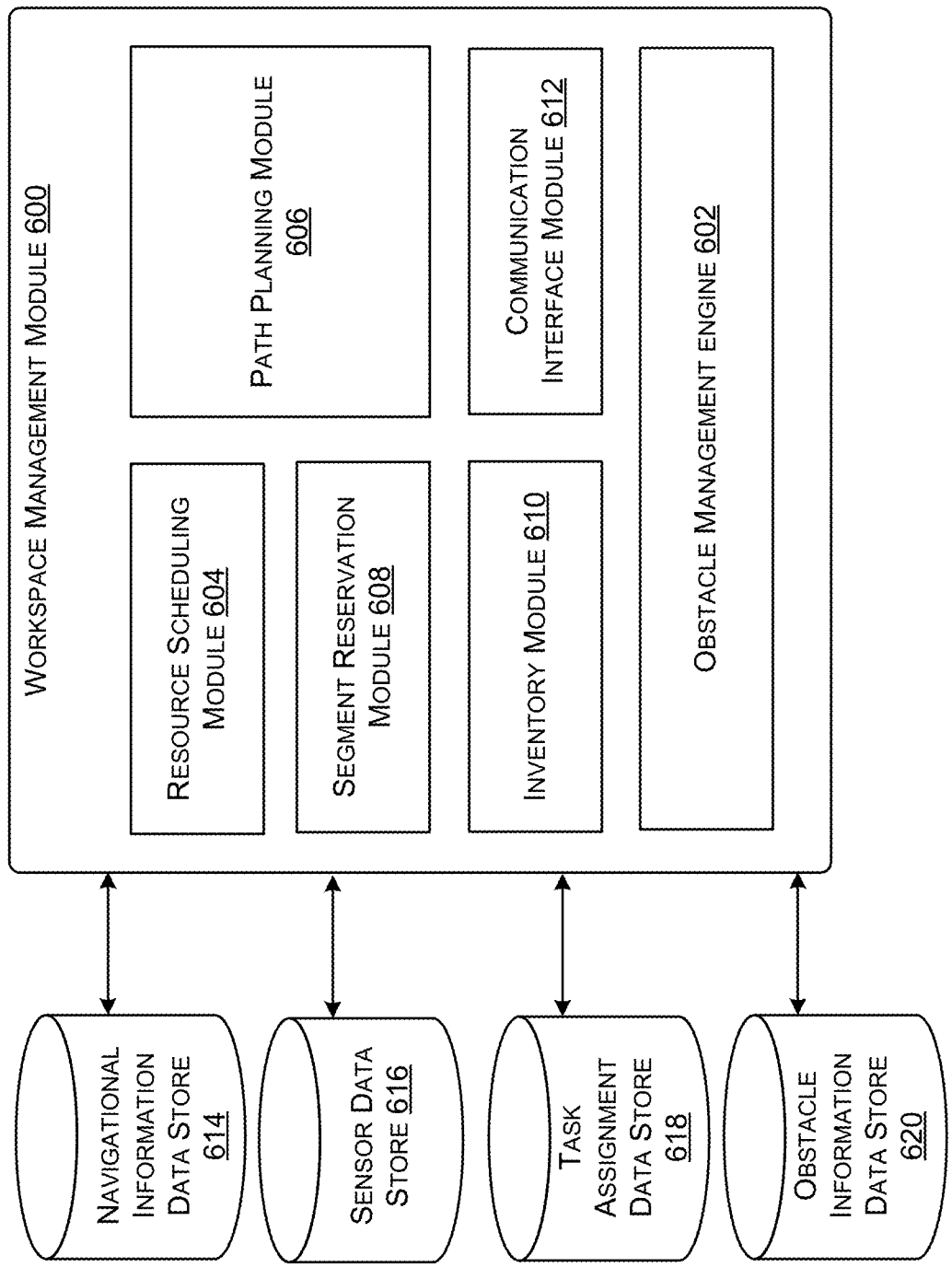
FIG. 6 illustrates in greater detail the components of an example management module, including an obstacle management engine that may be utilized in at least one embodiment.

FIG. 6 illustrates in greater detail the components of an example workspace management module 600 (e.g., the workspace management module 102 of FIG. 1, the workspace management modules 515/533 of FIG. 5), including an obstacle management engine 602 (e.g., the obstacle management engine 103 of FIGS. 1-5), that may be utilized in at least one embodiment. As shown, the example embodiment includes a resource scheduling module 604, a path planning module 606, a segment reservation module 608, an inventory module 610, a communication interface module 612, and the obstacle management engine 602. As discussed above, the workspace management module 600 may represent a single component, multiple components located at a central location within inventory system (e.g., the service provider computer(s) 502 of FIG. 5), or multiple components distributed throughout inventory system. For example, workspace management module 600 may represent components of one or more of MDU(s) 104 of FIG. 5 that are capable of communicating information between the MDU(s) 104 and coordinating the movement of the MDU(s) 104 within a workspace (e.g., the workspace 106 of FIG. 1). In general, the workspace management module 600 may include any appropriate combination of hardware and/or software suitable to provide the described functionality. It should be appreciated that while the obstacle management engine 602 is depicted in FIG. 6 as part of the workspace management module 600, the obstacle management engine 602 may execute as a process and/or module separate from, but in communication with, the workspace management module 600. By way of example, the obstacle management engine 602 may operate as a standalone module configured to communicate with any suitable combination of the workspace management module 600, the navigational information data store 614, the sensor data store 616, the task assignment data store 618, and/or the obstacle information data store 620.

In at least one embodiment, the resource scheduling module 604 may be configured to process received inventory requests and generate one or more assigned tasks to be completed by the components of the inventory system 500. The resource scheduling module 604 may also select one or more appropriate components for completing the assigned tasks and may communicate, via the communication interface module 612, the assigned tasks to the relevant components. In some examples, the resource scheduling module 604 may select the one or more appropriate components (e.g., MDUs) based on a location of the MDU (e.g., as determined by utilizing fiducial markers 114 of FIG. 1, by utilizing images/videos of the workspace 106 and image recognition techniques, by utilizing global positioning system devices of the MDU(s) 104, or by any suitable method). Additionally, the resource scheduling module 604 may also be responsible for generating assigned tasks associated with various management operations, such as prompting MDU(s) 104 to recharge batteries or have batteries replaced, instructing inactive MDU(s) 104 to park in a location outside the anticipated traffic flow or a location near the anticipated site of future tasks, and/or directing the MDU(s) 104 selected for repair or maintenance to move towards a designated maintenance station. Additionally, the resource scheduling module 604 may also be responsible for assigning tasks and/or updating previously-assigned tasks in response to data (e.g., congestion information, supplemental information, etc.) provided and/or generated by the obstacle management engine 602. In some embodiments, these task assignments may be stored in task assignment data store 618.

In at least one embodiment, the path planning module 606 (e.g., an example of the path planning module 406 of FIG. 4) may receive route requests from the MDU(s) 104. These route requests may identify one or more destinations associated with a task the requesting mobile drive unit is executing. In response to receiving a route request, the path planning module 606 may generate a path to one or more destinations identified in the route request. The path planning module 606 may implement any appropriate algorithms utilizing any appropriate parameters, factors, and/or considerations to determine the appropriate path. In some embodiments, the path planning module 606 may be configured to receive obstacle information (or obtain obstacle information from the obstacle information data store 620). The path planning module 606 may utilize the obstacle information when generating paths such that the generated paths avoid traversing a location and/or area associated with an obstacle. In some embodiments, the path planning module 606 may generate a path that traverses an area associated with an obstacle (e.g., congestion) as one of a number of possible paths for the MDU. However, a path selection process of the path planning module 606 may be biased so as to prefer paths that do not traverse congested locations/areas (or locations/areas associated with other types of obstacles) over paths that do. After generating (and selecting) an appropriate path, the path planning module 606 may transmit a response identifying the generated path to the requesting component (e.g., an MDU, the obstacle management engine 602). In some embodiments, the path planning module 606 may communicate the generated path using the communication interface module 612. In some embodiments, the path planning module 606 may store the planned path in the task assignment data store 618 as part of the task assignment or in a separate record associated with the task assignment. In some embodiments, the planned path associated with a task may be stored in a separate data store (not depicted) which is accessible to any suitable component of the workspace management module 600.

In at least one embodiment, the segment reservation module 608 may receive reservation requests from the MDU(s) 104 attempting to move along paths generated by the path planning module 606. These reservation requests may indicate a request for the use of a particular portion of the workspace 106 (referred to herein as a "segment") to allow the requesting mobile drive unit to avoid collisions with other MDU(s) 104 while moving across the reserved segment. In response to received reservation requests, segment reservation module 608 may transmit a reservation response granting or denying the reservation request to the requesting mobile drive unit using the communication interface module 612. In some embodiments, the reservation requests may constitute navigational information and may be stored within the navigational information data store 614.

In at least one embodiment, the inventory module 610 may maintain information about the location and number of inventory items in the inventory system 500. Information can be maintained about the inventory items in a particular receptacle (e.g., a receptacle 112 of FIG. 1), and the maintained information can include the location of those inventory items within the receptacle (e.g., within a sub-area of a storage container, within a bin, tote, etc.). The inventory module 610 can also communicate with the MDU(s) 104, utilizing task assignments to maintain, replenish or move inventory items within the inventory system 500.

In at least one embodiment, the communication interface module 612 may facilitate communication between workspace management module 600 and other components of inventory system 500, including reservation responses, reservation requests, path requests, path responses, and task assignments. These reservation responses, reservation requests, path requests, path responses, and task assignments may represent communication of any form appropriate based on the capabilities of workspace management module 600 and may include any suitable information. Depending on the configuration of workspace management module 600, communication interface module 612 may be responsible for facilitating either or both of wired and wireless communication between workspace management module 600 and the various components of inventory system 500. In particular embodiments, workspace management module 600 may communicate using communication protocols such as 802.11, Bluetooth, or Infrared Data Association (IrDA) standards. Furthermore, workspace management module 600 may, in particular embodiments, represent a portion of mobile drive unit or another component of inventory system 500. In such embodiments, communication interface module 612 may facilitate communication between workspace management module 600 and other parts of the same system component.

Any suitable component of the workspace management module 600 may be configured to receive sensor data from one or more MDUs and store such data within the sensor data store 616. Similarly, any suitable component of the workspace management module 600 may be configured to receive navigational information at any suitable time from one or more MDUs and store such data within the navigational information data store 614.

In some embodiments, the obstacle management engine 602 may be configured obtain navigational information (e.g., from the navigational information data store 614). The navigational information may correspond to one or more components (e.g., MDUs, user computing devices, etc.) of the workspace and may have been initially provided to any suitable module of the workspace management module 600 and stored in the navigational information data store 614. Alternatively, the obstacle management engine 602 may request navigational information for the components (e.g., MDUs, user computing devices, robotic arms, etc.) of the workspace from any suitable module of the workspace management module 600 and/or from the components directly. The obstacle management engine 602 may utilize the navigational information to identify a current location (and/or other attributes such as current speed, current state, etc.) for each of the components within the workspace.

In some embodiments, the obstacle management engine 602 may be configured obtain sensor data (e.g., from the sensor data store 616). The sensor may correspond to one or more components (e.g., sensors of one or more MDUs, standalone sensors, sensors of a user computing device and/or robotic arm, etc.) and may have been initially provided to any suitable module of the workspace management module 600 and stored in the sensor data store 616. Alternatively, the obstacle management engine 602 may request sensor data from the components of the workspace (e.g., MDUs, user computing devices, robotic arms, etc.) and/or from any suitable module of the workspace management module 600.

In some embodiments, the obstacle management engine 602 may be configured to obtain restricted space data from the obstacle information data store 620. The restricted space data may be user defined and/or predefined to indicate one or more locations/areas of the workspace that are restricted, that is, locations/areas that are to be avoided by the MDUs. In some embodiments, the restricted space data may indicate a location/area is restricted based at least in part on a specified day/time, or in some embodiments, the restricted space may be persistent (e.g., the location/area is restricted regardless of the day and/or time).

The obstacle management engine 602 may be configured to detect one or more obstacles from any suitable combination of the navigational information and/or the sensor data and/or the restricted space data. By way of example, the obstacle management engine 602 may be configured to determine that an instance of sensor data indicates an obstacle (e.g., a condition that is not supposed to be occurring with the workspace). In some embodiments, the obstacle management engine 602 may be configured to determine a location associated with the sensor collector (e.g., an MDU, a standalone sensor, etc.). Utilizing the sensor data and/or the location associated with the sensor collector, the obstacle management engine 602 may identify a location associated with the obstacle. Regardless of the particular data utilized to detect the obstacle, the obstacle management engine 602 may generate obstacle information (e.g., indicating a type of obstacle, the location and/or area of the obstacle, or any suitable information describing any suitable aspect of the obstacle) for each detected/determined obstacle and may store this obstacle information in obstacle information data store 620. In some embodiments, the obstacle management engine 602 may provide the obstacle information to any suitable component of the workspace management module 600 (e.g., the path planning module 606).

In some embodiments, the obstacle may be detected based at least in part on navigational information provided by the MDUs of the system. In some embodiments, the obstacle management engine 602 may be configured to generate a grid of volumes corresponding to various sub portions of the workspace. These volumes may include a set of vertical volumes and/or a set of horizontal volumes. Each volume may overlap one or more other volumes and the grid of volumes may be generated to cover the entire workspace. The obstacle management engine 602 may perform operations to generate density values for each of the volumes of the grid, utilizing the navigational information indicating locations of each MDU. A current density value for each volume may be generated to indicate a number of MDUs currently within an area associated with the given volume. In some embodiments, a set of one or more historic density values may be generated for each volume corresponding to a number of historic time periods (e.g., 0-20 seconds of the last minute, 20-40 seconds of the last minute, 40-60 of the last minute, etc.).

In some embodiments, the obstacle management engine 602 may be configured to generate a set of one or more future density values (for each volume) corresponding to a number of future time periods (e.g., 0-10 seconds in the future, 10-20 seconds in the future, etc.). The future density values may be generated by the obstacle management engine 602 based at least in part on planned path data associated with any suitable number of the MDUs in the workspace 204. The obstacle management engine 602 may be configured to execute a protocol set utilizing the current density value, one or more historic density values, and/or one or more future density values associated with a given volume to determine when a volume has become (or will become) congested. When an area of current and/or future congestion is identified, the obstacle management engine 602 may be configured to generate obstacle information that describes any suitable aspect of the congestion (e.g., a location/area of the congestion, etc.) and store the obstacle information within the obstacle information data store 620 (e.g., an example of the obstacle information data store 404 of FIG. 4).

The obstacle management engine 602 may be configured to update path planning operations for the workspace utilizing the obstacle information. In some embodiments, storing the obstacle information in the obstacle information data store 404 may cause path planning operations (e.g., performed by the path planning module 606) to utilize the obstacle information when determining new paths for task execution. In some embodiments, the obstacle management engine 602 may be configured to provide an indication of the existence of the obstacles, or the obstacle information itself, directly to the path planning module 606 to stimulate utilization of the obstacle information for path planning purposes.

The obstacle management engine 602 may be configured to identify one or more tasks affected by the detected obstacle. As a non-limiting example, the obstacle management engine 602 may obtain planned path data for the task assigned to each MDU in the workspace (e.g., from the task assignment data store 618). The planned path data for each task may be utilized, along with the location/area of the obstacle (e.g., a portion of the obstacle information), to identify that a particular task is affected by the obstacle.

In some embodiments, the obstacle management engine 602 may be configured to determine that one or more of the tasks of the MDUs are to be reassigned and/or cancelled in light of the detected obstacle. The obstacle management engine 602 may determine whether or not an obstacle is detected at a source location or destination location associated with the task, or at a current location of the MDU. If the obstacle is detected at one of these locations, the obstacle management engine 602 may determine, based at least in part on any suitable attribute associated with the obstacle (e.g., type, size, shape, duration of existence, etc.) that the task is to be reassigned or cancelled. For example, a fallen object located at a destination location of the planned path may cause the task to be cancelled while congestion occurring at the destination location may not. In some embodiments, the obstacle management engine 602 may perform any suitable operations to cause these tasks to be reassigned and/or cancelled.

In some embodiments, the obstacle management engine 602 may be configured to transmit new path requests to the path planning module 606 to request a new path(s) for tasks associated with one or more MDUs. By way of example, the obstacle management engine 602 may submit a new path request to the path planning module 606 for each task that has been determined to be affected by the detected obstacle. In some embodiments, the obstacle management engine 602 may not submit a new path request for tasks that have already been reassigned or cancelled. In response to a new path request, the path planning module 606 may be configured to attempt generation of a new path for the corresponding MDU. As part of generating a new path, the path planning module 606 may obtain obstacle information from the obstacle management engine 602 and/or the obstacle information data store 620. The path planning module 606 may generate response data including a new path generated and/or an indication that the request was denied (or that a new path could not be generated in light of the obstacles within the workspace). Response data (e.g., indicating a new path for the MDU, or indicating that a new path could not be determined, etc.) may be provided to the obstacle management engine 602 for further processing.

In some embodiments, the obstacle management engine 602 may be configured to determine whether the originally planned path (the current path) of the MDU is "infeasible," that is, a delay (or other cost) would be incurred by executing the originally planned path exceeds a predetermined infeasibility threshold. A planned path may be determined to be "infeasible" based at least in part on determining that a delay in task completion has exceeded a threshold infeasibility amount due to the detected obstacle. In some embodiments, the obstacle management engine 602 may be configured to generate a metric (e.g., an estimated completion time) that identifies a time of completion for the task should the planned path be utilized for task execution in light of the obstacle detected. In some embodiments, a task completion time that was determined before the obstacle was detected (herein referred to as the "original task completion time") may be compared to the estimated task completion time that is calculated based at least in part on the obstacle detected (herein referred to as the "obstacle-based task completion time"). If the obstacle-based task completion time exceeds the original task completion time by at least the predetermined infeasibility threshold, then executing the task utilizing the planned path may be considered "infeasible."

In situations in which the planned path has been determined to be infeasible, and the response data indicates a denial of the request (e.g., a new path was unavailable, etc.), the obstacle management engine 602 may be configured to transmit any suitable data to any suitable module of the workspace management module 600 (e.g., the resource scheduling module 604) in order to cause the task assigned to the MDU to be reassigned to a different MDU or cancelled altogether.

As another example, if a new path was provided in the response data, the obstacle management engine 602 may be configured to generate a metric for the new path that identifies a time of completion for the task should the new path be utilized for task execution (herein referred to as a "new path completion time"). In some embodiments, if a comparison of the new path completion time to the original task completion time exceeds the infeasibility threshold, the obstacle management engine 602 may transmit any suitable data to any suitable module of the workspace management module 600 (e.g., the resource scheduling module 604) in order to cause the task assigned to the MDU to be reassigned to a different MDU or cancelled altogether. Thus, if the planned path is determined to be infeasible and the new path is also determined to be infeasible, the task may be reassigned or cancelled.

In some embodiments, if the planned path is determined to be infeasible, but the new path is not infeasible (e.g., the new path completion time is less than the original completion time of the planned path, or at least does not exceed the original completion time by over the infeasibility threshold, etc.), the obstacle management engine 602 may associated the task with an "Alternate_Feasible_Path" label. In some embodiments, the obstacle management engine 602, through this association or otherwise, may cause the MDU assigned to the task to execute the task utilizing the new path. The obstacle management engine 602 may perform any suitable operations to cause the MDU to commence execution of the task utilizing the new path such as transmitting the task, the label, and/or the new path to the MDU and/or to the workspace management module.

In some embodiments, the obstacle management engine 602 may determine that, although the planned path is not infeasible, the new path may result in a completion time that is less than the obstacle-based completion time and/or original completion time of the planned path by at least a predetermined cost threshold amount. Accordingly, the obstacle management engine 602 may determine that the new path is a cheaper alternative to the planned path. In some embodiments, the obstacle management engine 602 may store an association of the new path and the MDU with a classification label indicating that a cheaper path exists (e.g., "Cheaper_Path_Available"). In some embodiments, the obstacle management engine may update a corresponding task (e.g., a task assignment) to indicate the classification label and/or the new path. Any suitable combination of the task assignment, classification label, and/or new path may be provided to the MDU and/or workspace management system. The MDU and/or the workspace management system may perform any suitable operations to determine whether or not to cause the MDU to execute the task utilizing the new path.

In some embodiments, if the planned path is not infeasible and the new path is not cheaper than the planned path by at least the cost threshold amount, the obstacle management engine 103 may be configured to ignore the existence of the new path and the MDU may continue executing the task utilizing the planned path.

It should be appreciated that completion times are utilized as an example only. It is contemplated that the obstacle management engine 602 may perform a comparison between the planned path and the new path utilizing completion times and/or any suitable combination of parameters/metrics to identify which path should be utilized for task execution. Example parameters may include a priority of the task, a distance between the current location of the MDU and the destination location for the task, whether or not the task corresponds to conveyance of an item, a priority associated with the item (e.g., expedited shipping of the item), any suitable parameter associated with the task, a determination that one or more other planned paths would need to be altered in the workspace should new path be utilized, a determination that executing the new path may create a new obstacle (e.g., based on future congestion), and the like.

In some embodiments, the obstacle management engine 602 may be configured to perform one or more remedial actions. For example, the obstacle management engine 602 may provide a notification (e.g., an email, a text message, an audible alert, a push notification, etc.) to one or more network pages and/or user computing devices to indicate the existence of the obstacle. As another example of a remedial action, the obstacle management engine 602 may transmit the new path and/or the classification label to an MDU to cause the planned path of the MDU to be altered. As another example, the obstacle management engine 602 may transmit at least the classification label or another indicator corresponding to the classification label that, upon receipt, may cause an MDU to request a new path from the workspace management module 102 (e.g., from the path planning module 606). As yet another example, the obstacle management engine 602 may store the classification label, new path, and/or any suitable obstacle information within the obstacle information data store 620 to make the obstacle information accessible to one or more modules of the workspace management module 102. As yet another example, the obstacle management engine 602 may request that a task be reassigned and/or cancelled. In some embodiments, storing the obstacle information within the obstacle information data store 620 and/or providing the obstacle information directly to the path planning module 606 may cause the path planning module 606 (or any suitable module of the workspace management module 102) to perform, at any suitable time, one or more operations. For example, the path planning module 606 may utilize obstacle information provided/stored by the obstacle management engine 602 (e.g., obstacle information of the obstacle information data store 620) when generating paths for MDUs within the workspace. In some embodiments, the paths may be generated so as to avoid any known obstacles.

In general, the resource scheduling module 604, the path planning module 606, the segment reservation module 608, the inventory module 610, the communication interface module 612, and the obstacle management engine 602, may each represent any appropriate hardware and/or software suitable to provide the described functionality. In addition, as noted above, workspace management module 600 may, in particular embodiments, represent multiple different discrete components and any or all of the resource scheduling module 604, the path planning module 606, the segment reservation module 608, the inventory module 610, the communication interface module 612, and the obstacle management engine 602 may represent components physically separate from the remaining elements of workspace management module 600. Moreover, any two or more of the resource scheduling module 604, the path planning module 606, the segment reservation module 608, the inventory module 610, the communication interface module 612, and/or the obstacle management engine 602 may share common components.

Figure 7:
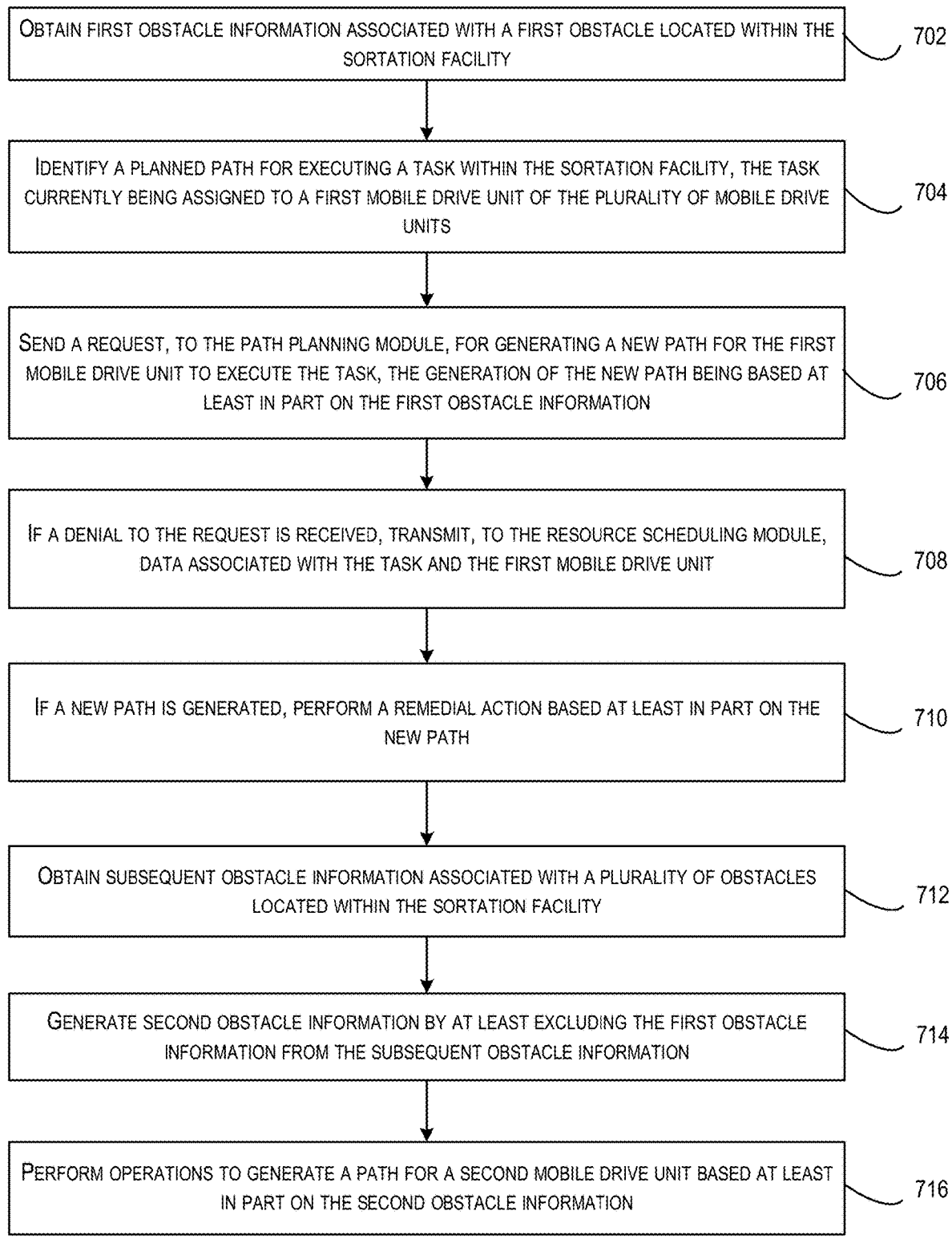
FIG. 7 is a flowchart illustrating an example method for performing one or more remedial actions in response to obstacle detection within a workspace, in accordance with at least one embodiment.

FIG. 7 is a flowchart illustrating an example method 700 for performing one or more remedial actions in response to obstacle detection within a workspace, in accordance with at least one embodiment. The method may be performed by a system (e.g., the inventory system 500 of FIG. 5) comprising a plurality of mobile drive units located within a facility (e.g., a sortation facility, a storage facility, etc.) and individually configured to move items within the facility, one or more data networks, a resource scheduling module (e.g., the resource scheduling module 604 of FIG. 6), a path planning module (e.g., the path planning module 606 of FIG. 6), an obstacle management engine (e.g., the obstacle management engine 103 and/or 602 of FIGS. 1-6), one or more processors, and one or more memories storing computer-readable instructions that, upon execution by the one or more processors, cause the inventory system to at least to perform the operations of method 700. It should be appreciated that the system may alternatively include a plurality of user computing devices and/or robotic devices located within the facility and that the method 700 may similarly be applied in these use cases.

The method may begin at block 702, where first obstacle information associated with a first obstacle located within the sortation facility is obtained. The first obstacle information may be obtained (e.g., generated) by the obstacle management engine 602 based at least in part on any suitable combination of sensor data and/or navigational information provided by any suitable number of components of the system (e.g., MDUs, standalone sensors, sensors of user computing devices, user computing devices, robotic arms, sensors of robotic arms, etc.).

At 704, a planned path for executing a task within the sortation facility may be identified (e.g., by the obstacle management engine 602 utilizing the planned path data of the planned path data store 618 of FIG. 6). In some embodiments, the task may be currently assigned to a first mobile drive unit of the plurality of mobile drive units. The planned path may be identified based at least in part on the first obstacle information. That is, the planned path may be identified based at least in part on determining that a location of the obstacle, as provided in the first obstacle information, overlaps/intersects some portion of the planned path (e.g., a portion of the planned path that has not yet been executed).

At 706, a request may be sent to the path planning module (e.g., path planning module 606 of FIG. 6) for generating a new path for the first mobile drive unit to execute the task. In some embodiments, the generation of the new path may be based at least in part on the first obstacle information. That is, the path planning module 606 may utilize the first obstacle information (and potentially obstacle information of all known obstacles) to ensure that the new path does not include a location associated with the obstacle.

At 708, if a denial to the request is received, data associated with the task and the first mobile drive unit may be transmitted (e.g., by the obstacle management engine 602), to the resource scheduling module (e.g., the resource scheduling module 604), to cause the resource scheduling module to reassign the task to a different mobile drive unit of the plurality of mobile drive units.

At 710, if the new path is/has been generated, a remedial action may be performed based at least in part on the new path. By way of example, the obstacle management engine 602 may generate a metric for the new path that identifies a time of completion for the task should the new path be utilized for task execution (herein referred to as a "new path completion time"). In some embodiments, if a comparison of the new path completion time to the original task completion time exceeds the infeasibility threshold, the obstacle management engine may transmit any suitable data to any suitable module of the workspace management module in order to cause the task assigned to the MDU to be reassigned to a different MDU or cancelled altogether. Thus, if the planned path is determined to be infeasible and the new path is also determined to be infeasible, the task may be reassigned or cancelled. In some embodiments, the method 700 may end at 710 or the method may continue to 712.

As another example, if the planned path is determined to be infeasible, but the new path is not infeasible (e.g., the new path completion time is less than the original completion time of the planned path, or at least does not exceed the original completion time by over the infeasibility threshold, etc.), the obstacle management engine may associated the task with an "Alternate_Feasible_Path" label. In some embodiments, the obstacle management engine, through this association or otherwise, may cause the MDU assigned to the task to execute the task utilizing the new path. The obstacle management engine may perform any suitable operations to cause the MDU to commence execution of the task utilizing the new path such as transmitting the task, the label, and/or the new path to the MDU and/or to the workspace management module.

As yet another example, the obstacle management engine may determine that, although the planned path is not infeasible, the new path may result in a completion time that is less than the obstacle-based completion time and/or original completion time of the planned path by at least a predetermined cost threshold amount. Accordingly, the obstacle management engine may determine that the new path is a cheaper alternative to the planned path. In some embodiments, the obstacle management engine may store an association of the new path and the MDU with a classification label indicating that a cheaper path exists (e.g., "Cheaper-_Path_Available"). In some embodiments, the obstacle management engine may update a corresponding task (e.g., a task assignment) to indicate the classification label and/or the new path. Any suitable combination of the task assignment, classification label, and/or new path may be provided to the MDU and/or workspace management system. The MDU and/or the workspace management system may perform any suitable operations to determine whether or not to cause the MDU to execute the task utilizing the new path.

As yet another example of a remedial action, the obstacle management engine may notify one or more users of the existence of the detected obstacle. This notification may be in any suitable electronic form (e.g., email, text message, display via a network page hosted by the obstacle management engine, etc.).

In some embodiments, if the planned path is not infeasible and the new path is not cheaper than the planned path by at least the cost threshold amount, the obstacle management engine may ignore the new path and the MDU may continue executing the task utilizing the planned path.

At 712, subsequent obstacle information associated with a plurality of obstacles located within the sortation facility may be obtained (e.g., by the obstacle management engine 602). For example, the obstacle management engine 602 may generate obstacle information for each obstacle subsequently detected (e.g., utilizing subsequent sensor data and/or subsequent navigational information and/or restricted space data).

At 714, second obstacle information by at least excluding the first obstacle information from the subsequent obstacle information. Said another way, the obstacle management engine 602 may exclude the first obstacle information from being reprocessed by the system after one or more remedial actions have been performed by generating obstacle information only for newly detected obstacles.

At 716, operations may be performed (e.g., by the obstacle management engine 602 and/or the path planning module 606) to generate a new path for a second mobile drive unit based at least in part on the second obstacle information.

Figure 8:
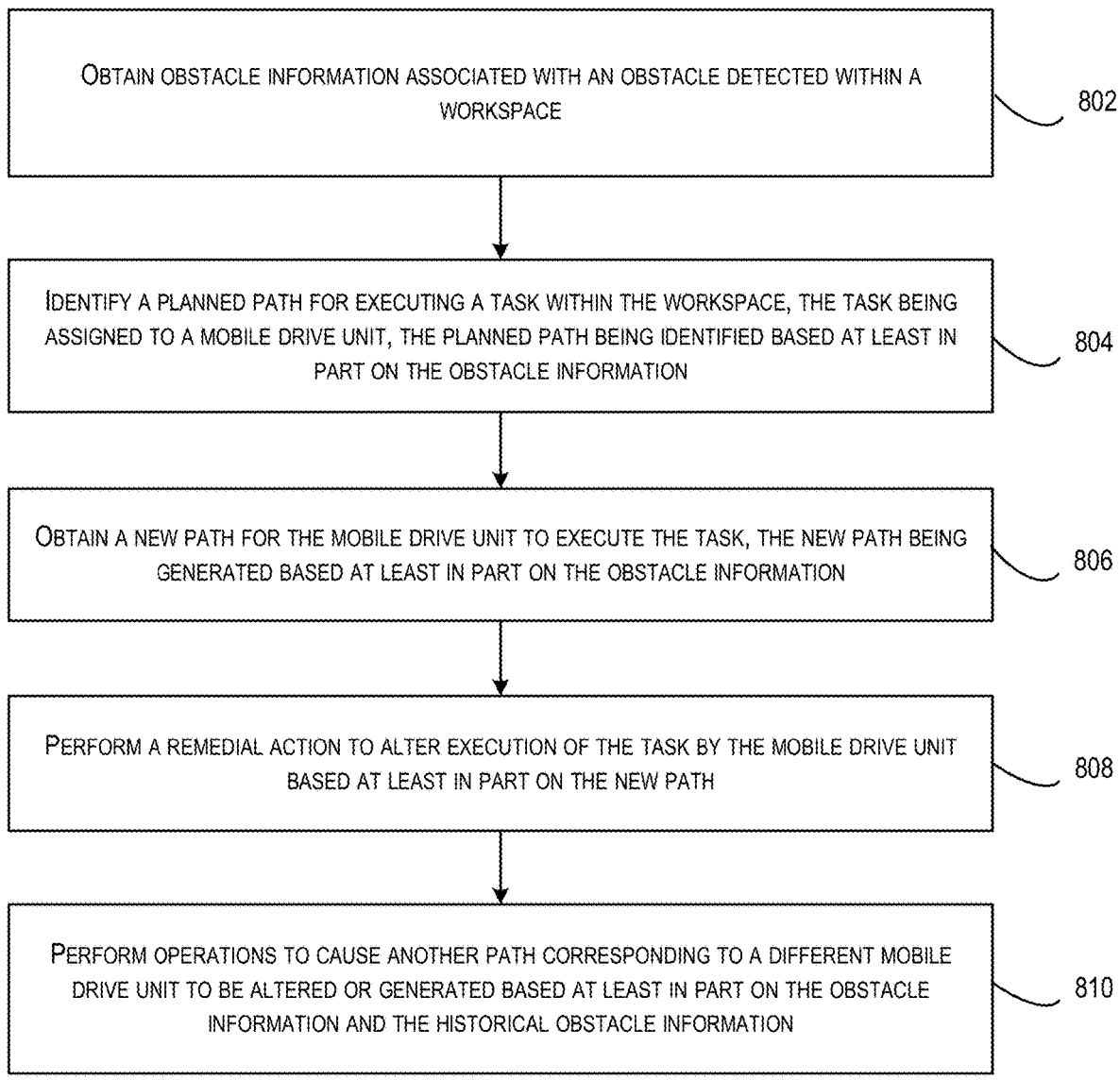
FIG. 8 is a flowchart illustrating another example method performing a remedial action in response to obstacle within a workspace, in accordance with at least one embodiment.

FIG. 8 is a flowchart illustrating another example method 800 for performing one or more remedial actions in response to obstacle detection within a workspace, in accordance with at least one embodiment. The method 800 may be performed by the obstacle management engine 602 of FIG. 6, an example of the obstacle management engine 103 of FIGS. 1-5.

The method may begin at block 802, where obstacle information associated with an obstacle detected within a workspace may be obtained by the obstacle management engine 602. In some embodiments, the obstacle information may be generated by the obstacle management engine 602 based at least in part on any suitable sensor data and/or navigational information accessible to the obstacle management engine 602.

At 804, a planned path for executing a task within the workspace may be identified by the obstacle management engine (e.g., the obstacle management engine 103 and/or 602 of FIG. 1-6). In some embodiments, the task may be assigned to a mobile drive unit. According to some embodiments, the task and/or the planned path may be identified based at least in part on obstacle information (e.g., obstacle information having been previously received and stored within the obstacle information data store 620, the obstacle information obtained at 802, etc.).

At 806, a new path for the mobile drive unit to execute the task may be obtained by the obstacle management engine 602. In some embodiments, the new path may be generated (e.g., by the path planning module 606 of FIG. 6) based at least in part on the obstacle information.

At 808, a remedial action may be performed by the obstacle management engine 602 to alter execution of the task by the mobile drive unit based at least in part on the new path. By way of example, the obstacle management engine 602 may transmit the new path to the MDU to cause the MDU to cause the MDU to begin execution of the new path. In some embodiments, transmitting the new path to the MDU may cause the MDU to exchange information with any suitable number of modules of a workspace management module (e.g., the workspace management module 600 of FIG. 6) to cause the MDU to execute the new path.

At 810, operations may be performed by the obstacle management engine 602 to cause another path corresponding to a different mobile drive unit to be altered or generated based at least in part on the obstacle information and the historical obstacle information. By way of example, the obstacle management engine 602 may store obstacle information in a data store accessible to other modules of the workspace management module 102. This stored information may be utilized by components of the workspace management module 102 to generate paths for the components of the system that cause the components (e.g., the MDUs) to avoid the obstacles.

Figure 9:
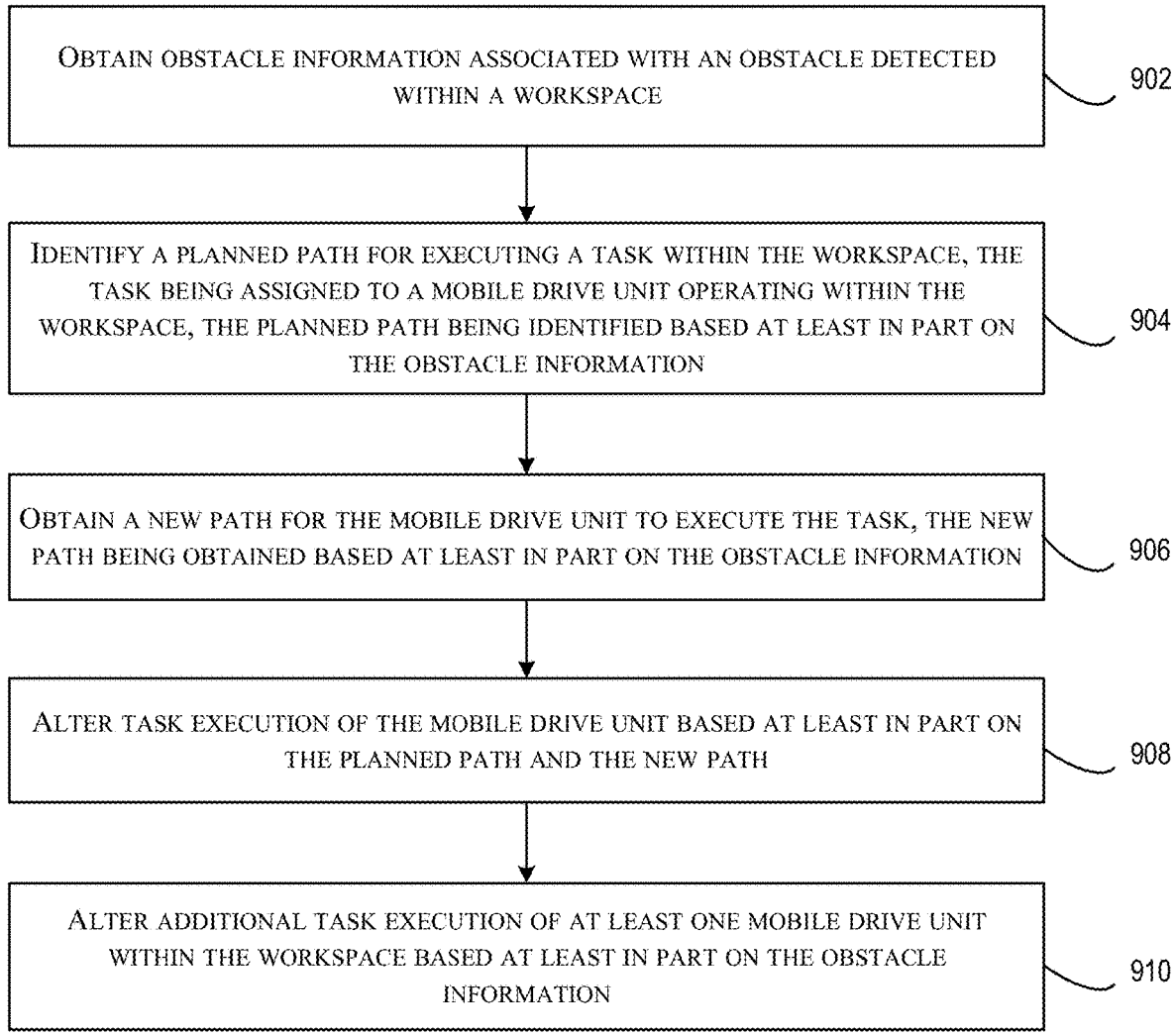
FIG. 9 is a flowchart illustrating an example method 900 for altering task execution in response to obstacle detection, in accordance with at least one embodiment.

FIG. 9 is a flowchart illustrating an example method 900 for altering task execution in response to obstacle detection, in accordance with at least one embodiment. A computer-readable storage medium may comprise computer-readable instructions that, upon execution by one or more processors, cause the one or more processors to perform the operations of method 900. The operations of the method 900 may be performed by the obstacle management engine 602 of FIG. 6, an example of the obstacle management engine 103 of FIGS. 1-5.

The method may begin at block 902, where obstacle information associated with an obstacle detected within a workspace may be obtained (e.g., from the obstacle information data store 620 of FIG. 6). In some embodiments, the obstacle information may be obtained by the obstacle management engine 602 by generating the obstacle information based at least in part on any suitable combination of sensor data and/or navigational information collected by any suitable combination of one or more MDUs and/or one or more sensors located within a workspace.

At 904, a planned path for executing a task within the workspace may be identified. In some embodiments, the task may be assigned to a mobile drive unit operating within the workspace. In some embodiments, the task and/or the planned path may be identified based at least in part on the obstacle information. That is, the planned path may be identified, for example, based at least in part on determining that a location/area indicated in the obstacle information and associated with the obstacle overlaps/intersects at least a portion of the planned path.

At 906, a new path for the mobile drive unit to execute the task may be obtained. In some embodiments, the new path may be obtained (and/or generated) based at least in part on the obstacle information.

At 908, task execution of the mobile drive unit may be altered based at least in part on the planned path and the new path. In some embodiments, the obstacle management engine 602 may generate any suitable metrics of the planned path and any suitable metrics of the new path. The obstacle management engine 602 may utilize the generated metrics to compare the planned path to the new path. In some embodiments, if the new path is determined to be more advantageous (e.g., based on the comparison), the task execution of the mobile drive unit may be altered to utilize the new path.

At 910, an additional task execution of at least one additional mobile drive unit within the workspace may be altered based at least in part on the obstacle information. That is, any suitable number of tasks and/or paths of any suitable number of mobile drive units may be altered based at least in part on the obstacle information.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A sortation system, comprising:
   a plurality of mobile drive units located within a sortation facility and individually configured to move items within the sortation facility;
   one or more data networks;
   a resource scheduling module separate from the plurality of mobile drive units and configured to assign the plurality of mobile drive units a plurality of tasks to be executed within the sortation facility;
   a path planning module separate from the plurality of mobile drive units and configured to calculate corresponding paths for execution of the plurality of tasks; and
   an obstacle management engine separate from the plurality of mobile drive units, the obstacle management engine comprising:
      one or more processors; and
      one or more memories storing computer-readable instructions that, upon execution by the one or more processors, cause the obstacle management engine to at least:
         obtain, from one or more mobile drive units of the plurality of mobile drive units, first obstacle information associated with a first obstacle located within the sortation facility;
         identify a planned path for executing a task within the sortation facility, the task currently being assigned to a first mobile drive unit of the plurality of mobile drive units, the planned path being identified based at least in part on the first obstacle information, the first mobile drive unit being different from the one or more mobile drive units from which the first obstacle information was obtained;
         send a request, to the path planning module, for generating a new path for the first mobile drive unit to execute the task, the generation of the new path being based at least in part on the first obstacle information;
         if a denial to the request is received, transmit, to the resource scheduling module, data associated with the task and the first mobile drive unit thereby causing the resource scheduling module to cancel the task or reassign the task to a different mobile drive unit of the plurality of mobile drive units; and
         if the new path is generated, perform one or more remedial actions based at least in part on the new path.

2. The sortation system of claim 1, wherein performing the one or more remedial actions causes the obstacle management engine to:
   generate a first estimated completion time associated with the planned path;
   generate a second estimated completion time associated with the new path; and
   when the second estimated completion time is less than the first estimated completion time by at least a threshold amount, transmit, over the one or more data networks to the first mobile drive unit, path data, the first estimated completion time, and the second estimated completion time thereby causing the first mobile drive unit to alter execution of the task.

3. The sortation system of claim 2, wherein performing the one or more remedial actions causes the obstacle management engine to:
   generate a classification label identifying the new path as an alternative feasible path or a cheaper path; and
   transmitting, with the path data, the classification label to the first mobile drive unit thereby causing the first mobile drive unit to determine whether to alter execution of the task based at least in part on the classification label.

4. The sortation system of claim 3, wherein the classification label is determined based at least in part on a comparison between the first estimated completion time and the second estimated completion time.

5. A computer-implemented method, comprising:
   obtaining, by an obstacle management engine, obstacle information associated with an obstacle detected within a workspace, the obstacle information being generated by a first mobile drive unit of a plurality of mobile drive units, the obstacle management engine being different from the plurality of mobile drive units;

identifying, by the obstacle management engine, a planned path for executing a task within the workspace, the task being assigned to a second mobile drive unit, the planned path being identified based at least in part on the obstacle information;

obtaining, by the obstacle management engine, a new path for the second mobile drive unit to execute the task, the new path being generated based at least in part on the obstacle information generated by the first mobile drive unit;

performing, by the obstacle management engine, one or more remedial actions to alter execution of the task by the second mobile drive unit based at least in part on the new path; and performing, by the obstacle management engine, operations to cause another path corresponding to a different mobile drive unit to be generated based at least in part on the obstacle information.

6. The computer-implemented method of claim 5, wherein the obstacle comprises at least one of: a physical object located within the workspace, a restricted space, or an area identified as being congested currently or at a future time.

7. The computer-implemented method of claim 5, further comprising:

determining, by the obstacle management engine, that the obstacle information indicates that the obstacle is located at a source location associated with the task or a destination location associated with the task, wherein determining that the obstacle information indicates that the obstacle is located at the source location or the destination location causes the obstacle management engine to forgo a request to generate the new path; and transmitting, by the obstacle management engine to a resource scheduling module, data that causes the resource scheduling module to reassign the task to another mobile drive unit, wherein the data is transmitted based at least in part on determining that the obstacle is located at the source location or the destination location.

8. The computer-implemented method of claim 7, further comprising:

determining an attribute associated with the obstacle based at least in part on the obstacle information, wherein transmitting the data is further based at least in part on the attribute associated with the obstacle.

9. The computer-implemented method of claim 5, wherein performing the one or more remedial actions further comprises:

generating, by the obstacle management engine, a first metric associated with the planned path;

generating, by the obstacle management engine, a second metric associated with the new path;

associating, by the obstacle management engine, the new path with a classification label based at least in part on a comparison of the first metric and the second metric; and transmitting, by the obstacle management engine, at least the classification label and the new path to cause the second mobile drive unit to alter execution of the task.

10. The computer-implemented method of claim 9, wherein the new path is associated with the classification label based at least in part on a comparison of the first metric and the second metric indicating that the second metric is less than the first metric by at least a threshold amount.

11. The computer-implemented method of claim 5, further comprising:

generating, by the obstacle management engine, subsequent obstacle information associated with a subsequent obstacle detected within the workspace, the subsequent obstacle information being generated by at least excluding the obstacle information associated with the obstacle; and performing, by the obstacle management engine, a subsequent remedial action to alter execution of a corresponding task of another mobile drive unit of the plurality of mobile drive units, the execution being altered based at least in part on the subsequent obstacle information.

12. The computer-implemented method of claim 11, wherein generating the subsequent obstacle information by at least excluding the obstacle information associated with the obstacle reduces a computational burden of the obstacle management engine.

13. The computer-implemented method of claim 5, wherein the planned path is identified based at least in part on determining that the planned path overlaps an area associated with the obstacle, the area being indicated by the obstacle information.

14. A non-transitory computer-readable storage medium comprising computer-readable instructions that, upon execution by one or more processors of an obstacle management system, cause the obstacle management system to perform operations comprising:

obtaining, by an obstacle management engine, obstacle information associated with an obstacle detected within a workspace, the obstacle information being generated by a first mobile drive unit of a plurality of mobile drive units, the obstacle management engine being different from the plurality of mobile drive units;

identifying a planned path for executing a task within the workspace, the task being assigned to a second mobile drive unit of the plurality of mobile drive units, the planned path being identified based at least in part on the obstacle information;

obtaining a new path for the second mobile drive unit to execute the task, the new path being obtained based at least in part on the obstacle information generated by the first mobile drive unit;

altering task execution of the second mobile drive unit based at least in part on the planned path and the new path; and altering additional task execution of at least one additional mobile drive unit of the plurality of mobile drive units based at least in part on the obstacle information generated by the first mobile drive unit.

15. The non-transitory computer-readable storage medium of claim 14, wherein altering the task execution of the second mobile drive unit comprises causing the task to be reassigned to another mobile drive unit, causing the task to be cancelled, or causing the second mobile drive unit to begin executing the new path.

16. The non-transitory computer-readable storage medium of claim 15, wherein the operations further comprise:

generating a first metric associated with the planned path and a second metric associated with the new path, wherein altering the task execution of the second mobile drive unit may be further based at least in part on determining that the first metric exceeds the second metric by at least a threshold amount.

17. The non-transitory computer-readable storage medium of claim 14, wherein the operations further comprise:
    detecting that the obstacle is located at an obstacle location that is different from a source location and a destination location of the planned path, wherein obtaining the new path for the second mobile drive unit is based at least in part on determining that the obstacle location is different from the source location and the destination location.

18. The non-transitory computer-readable storage medium of claim 14, wherein altering the task execution of the second mobile drive unit further comprises transmitting an indication that the new path is available, wherein transmitting the indication causes the second mobile drive unit to reserve space along at least a portion of the new path.

19. The non-transitory computer-readable storage medium of claim 14, wherein the operations further comprise:
    generating a first metric associated with the planned path, wherein the first metric is determined based at least in part on a first estimated completion time for the task if the task is executed utilizing the planned path; and
    generating a second metric associated with the new path, wherein the second metric is determined based at least in part on a second estimated completion time for the task if the task is executed utilizing the new path, wherein altering the task execution of the second mobile drive unit is based at least in part on a comparison of the first metric and the second metric.

20. The non-transitory computer-readable storage medium of claim 19, wherein the operations further comprise:
    determining an indicator value to be provided to the second mobile drive unit based at least in part on a comparison of the first metric and the second metric, the indicator value indicating that the task is infeasible and a reassignment of the task is required, that a cheaper path is available with respect to the task, or that execution of the task is required to be completed utilizing the new path.

\* \* \* \* \*